United States Patent
Maassarani

(10) Patent No.: US 11,903,784 B2
(45) Date of Patent: *Feb. 20, 2024

(54) DENTAL TOOL ASSEMBLY

(71) Applicant: Sami Maassarani, Birmingham, MI (US)

(72) Inventor: Sami Maassarani, Birmingham, MI (US)

( * ) Notice: Subject to any disclaimer, the term of this patent is extended or adjusted under 35 U.S.C. 154(b) by 264 days.

This patent is subject to a terminal disclaimer.

(21) Appl. No.: 17/391,522

(22) Filed: Aug. 2, 2021

(65) Prior Publication Data
US 2021/0361383 A1   Nov. 25, 2021

Related U.S. Application Data

(63) Continuation of application No. 16/261,170, filed on Jan. 29, 2019, now Pat. No. 11,076,934.

(60) Provisional application No. 62/623,244, filed on Jan. 29, 2018.

(51) Int. Cl.
*A61C 3/16* (2006.01)
*A61C 7/02* (2006.01)

(52) U.S. Cl.
CPC .............. *A61C 3/162* (2013.01); *A61C 7/023* (2013.01)

(58) Field of Classification Search
CPC ................................ A61C 3/162; A61C 7/023
See application file for complete search history.

(56) References Cited

U.S. PATENT DOCUMENTS

| | | |
|---|---|---|
| 659,182 A | 10/1900 | Pilling |
| 840,580 A | 1/1907 | McMillan |
| 936,695 A | 10/1909 | Barth |
| 1,130,281 A | 3/1915 | Hay |
| 1,472,462 A | 10/1923 | Theophile |
| 2,057,077 A | 10/1936 | Zimmer |
| 2,602,998 A | 7/1952 | Sprague |
| 2,723,661 A | 11/1955 | Hull |
| 3,898,738 A | 8/1975 | Linder |
| 3,911,583 A | 10/1975 | Hoffman |
| 3,986,265 A | 10/1976 | Cusato |
| 4,197,647 A | 4/1980 | Goldenthal |
| 4,204,330 A | 5/1980 | Ford |
| 4,904,183 A | 2/1990 | Hannan |

(Continued)

FOREIGN PATENT DOCUMENTS

| | | |
|---|---|---|
| CA | 2720442 A1 | 5/2012 |
| CA | 2969890 A1 | 12/2017 |
| CN | 201320222 Y | 12/2008 |

*Primary Examiner* — Ralph A Lewis
(74) *Attorney, Agent, or Firm* — The Dobrusin Law Firm, P.C.; Daniela M. Thompson-Walters

(57) ABSTRACT

A handling device for a dental tool having a) a body having an elongated shape configured to receive a prying load from an operator; and b) one or more receptacles through the body configured to retain at least a portion of a dental tool and allow an engagement portion of the dental tool to project therefrom substantially perpendicular to a longitudinal axis of the body; wherein the engagement portion is adapted to contact a portion of a dental covering along only one of a facial side or a lingual side of the dental covering and by being wedged between a gum-line and the dental covering; and wherein the one or more receptacles are configured to transfer the prying load from the body to the engagement portion of the dental tool.

10 Claims, 11 Drawing Sheets

(56) References Cited

U.S. PATENT DOCUMENTS

| | | |
|---|---|---|
| D308,804 S | 6/1990 | Hisscott |
| 5,057,016 A * | 10/1991 | Lukase ............... A61C 3/16 433/160 |
| 5,122,058 A | 6/1992 | Lukase et al. |
| 5,421,721 A | 6/1995 | Fyffe |
| D359,894 S | 7/1995 | Pomeroy |
| 5,538,421 A | 7/1996 | Aspel |
| 5,743,737 A | 4/1998 | Hawn |
| 5,820,368 A | 10/1998 | Wolk |
| 5,833,460 A | 11/1998 | Maeda |
| 5,928,254 A | 7/1999 | Jensen |
| 6,352,291 B1 | 3/2002 | Tortajada |
| 6,394,805 B1 | 5/2002 | Rabal |
| 6,413,088 B1 | 7/2002 | Kawaguchi |
| D463,554 S | 9/2002 | Li |
| 6,575,749 B1 | 6/2003 | Greenwald |
| 6,606,925 B1 | 8/2003 | Gmeilbauer |
| 6,752,380 B1 | 6/2004 | Taylor |
| D506,118 S | 6/2005 | Rau |
| 6,910,890 B2 | 6/2005 | Golden |
| 7,011,517 B2 | 3/2006 | Nicozisis |
| D627,886 S | 11/2010 | Williamson |
| 8,062,030 B2 | 11/2011 | Saubers |
| 8,152,525 B2 | 4/2012 | Rossi |
| 8,167,612 B2 | 5/2012 | DeSanti |
| 8,182,266 B2 | 5/2012 | Creasman |
| D666,668 S | 9/2012 | Present |
| 8,376,741 B2 | 2/2013 | Bednaz |
| 8,435,033 B2 | 2/2013 | Gross |
| 8,475,166 B1 | 7/2013 | LaMee |
| D734,852 S | 7/2015 | Lim |
| 9,084,650 B2 | 7/2015 | McCarthy |
| 11,076,934 B2 * | 8/2021 | Maassarani ............ A61C 3/162 |
| 2003/0091958 A1 | 5/2003 | Muller |
| 2003/0152887 A1 | 8/2003 | Freeman |
| 2005/0064358 A1 | 3/2005 | Nicozisis |
| 2005/0272006 A1 | 12/2005 | Rosenberg |
| 2006/0131906 A1 | 6/2006 | Maurer |
| 2007/0026357 A1 | 2/2007 | Farber |
| 2007/0072142 A1 | 3/2007 | Staines |
| 2010/0047740 A1 | 2/2010 | Fyffe |
| 2011/0045435 A1 | 2/2011 | Goodman |
| 2013/0078592 A1 | 3/2013 | McCarthy |
| 2013/0230817 A1 | 9/2013 | Kabbani |
| 2013/0244201 A1 | 9/2013 | Lim |
| 2013/0288196 A1 | 10/2013 | Gordon |
| 2015/0335396 A1 | 11/2015 | Block |
| 2017/0354479 A1 | 12/2017 | Maassarani |

* cited by examiner

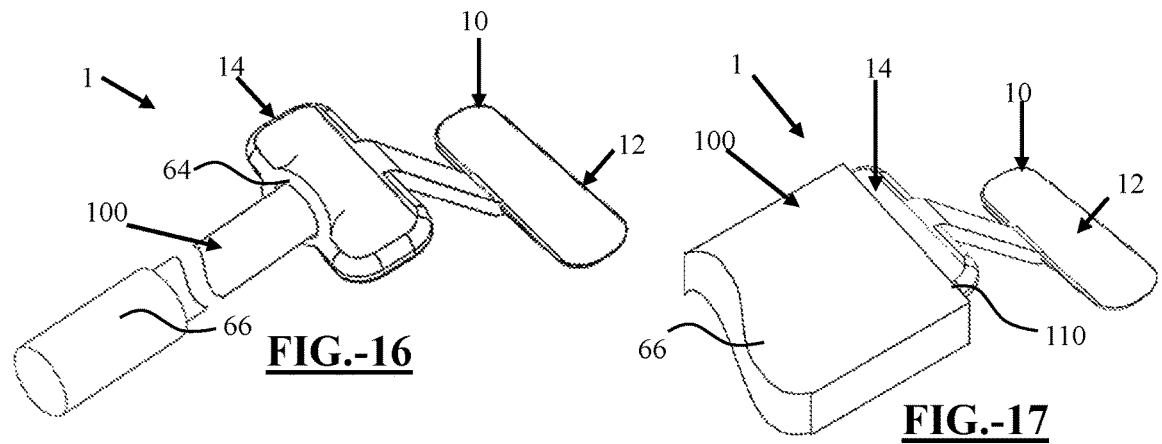
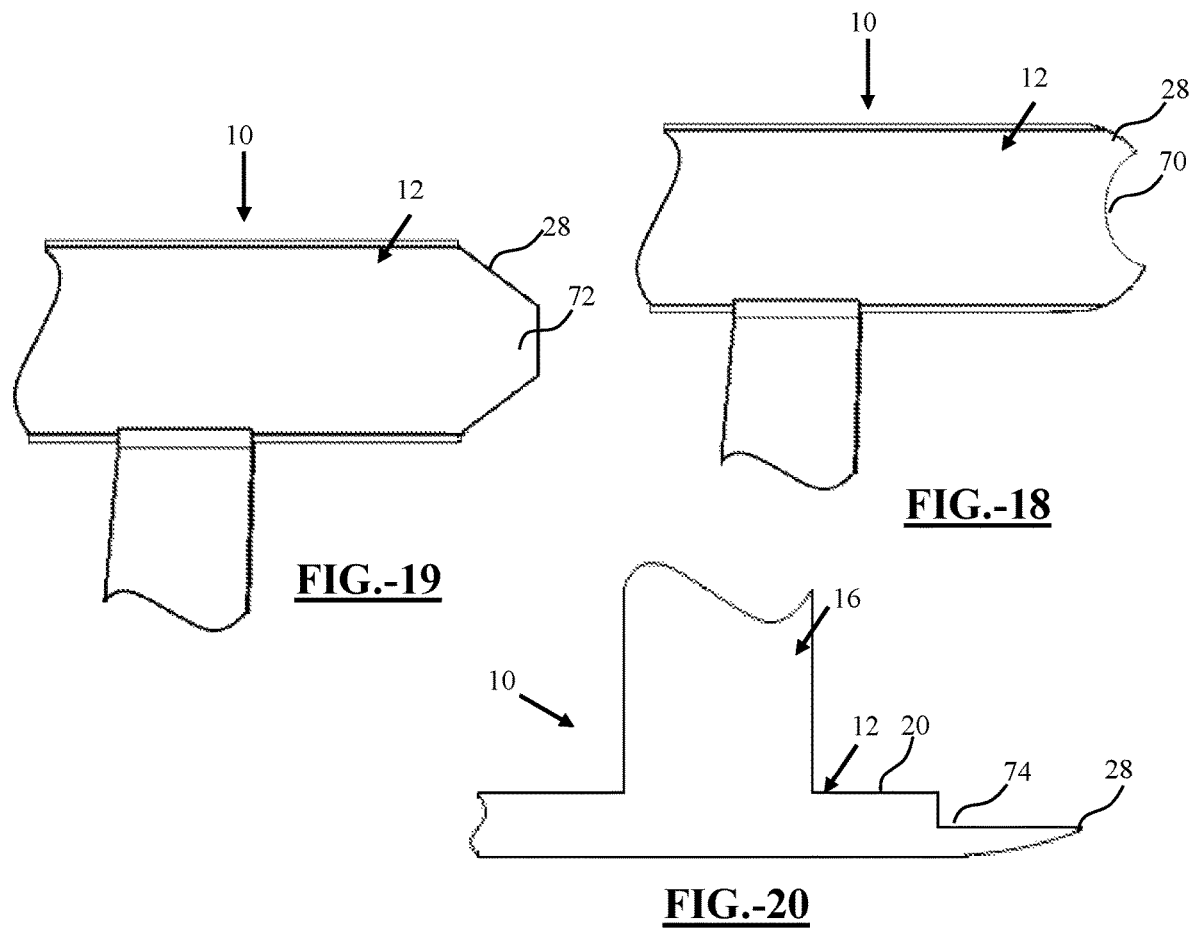

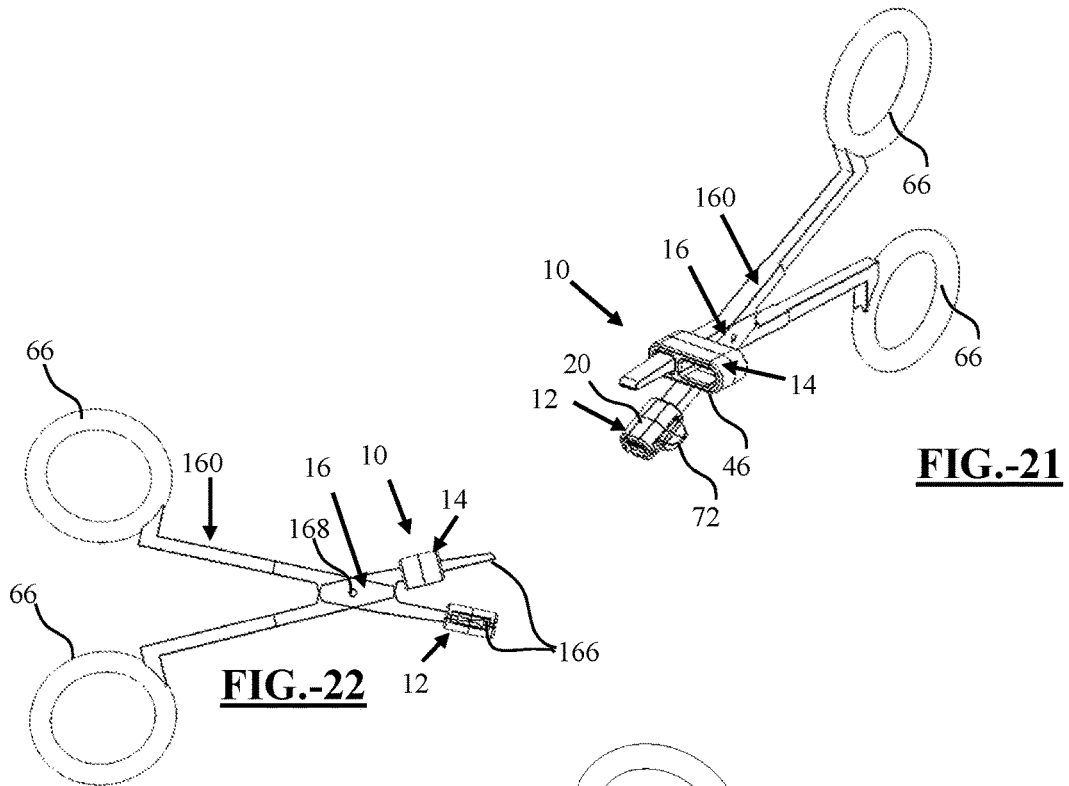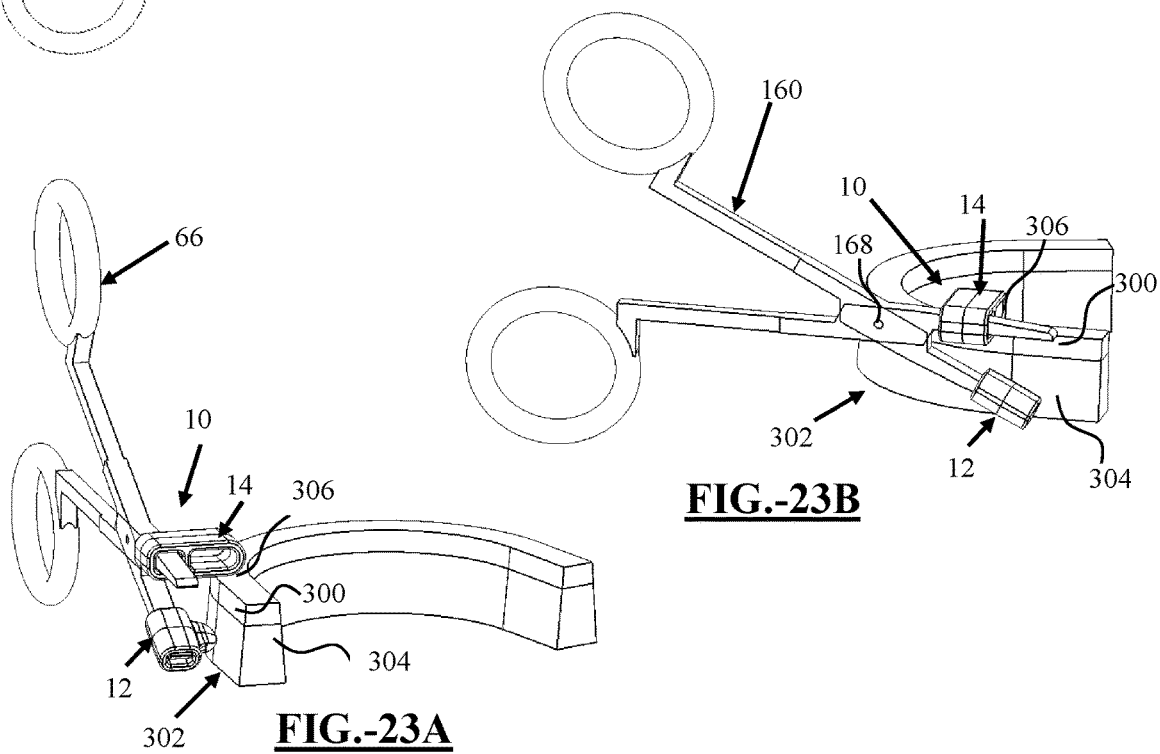

DENTAL TOOL ASSEMBLY

FIELD

The present disclosure relates to a dental tool assembly including a dental covering removal tool and dental tool handling device useful for removing a dental covering from an underlying structure. The present disclosure may specifically relate to a dental covering removal tool, handling device, or both which are adapted to assist a dental operator in removing temporary and permanent crowns from a patient's mouth.

BACKGROUND

In dental practice, while a permanent crown is fabricated for a patient, a patient is fitted with a temporary covering (e.g. such as a temporary crown). The temporary covering protects the original underlying tooth or post and allows a patient to maintain normal chewing while waiting for the permanent crown to be fabricated. The temporary covering is typically adhered with a short term dental adhesive to the underlying tooth or post. To ensure the temporary covering does not cause patient discomfort, the temporary covering may need to be removed multiple times during fitting. To expose the underlying tooth or post once the permanent crown is fabricated, the temporary covering needs to be removed from the patient's mouth.

Generally, for removal of a temporary dental covering, many dental operators (i.e., dental physicians) pinch grip the temporary dental covering to remove the covering from the underlying tooth or post. Hand and finger access may be limited. For example, the further toward the rear of a mouth of a patient, the more restricted the space for a dental physician's hand to access the dental covering. While removing the dental covering, a dental operator's hand may block visual access to the dental covering. To overcome access space, provide better control, and provide better visual access, hemostats, forceps and dental pliers have been utilized. Forceps style dental tools present the challenges of needing to contact opposing surfaces of a dental covering (i.e., lingual side and facial side) to apply a grip force. The grip force provided by these tools may result in damage to the dental covering, such as cracking and breaking. The size of these forceps style dental tools may result in patient discomfort. Generally, these forceps style tools are meant for long-term use due to their initial purchase cost.

US 2013/0244201; US 2011/0045435; U.S. Pat. Nos. 6,394,805; and 6,413,088 disclose varying forceps dental tools for removing dental coverings. U.S. Pat. No. 9,084,650 discloses a dental removal apparatus for removing dental appliances with a pry force. Notwithstanding the above, there appears to be an absence of a simple prying tool which can pry a dental covering (e.g. one located within a mouth of a patient) from an underlying surface without damaging the dental covering or the underlying surface. U.S. Pat. No. 9,687,316, incorporated herein in its entirety for all purposes, discloses a one-piece dental tool which allows for a dental operator to remove a dental covering while avoiding the use of hemostats, forceps, or dental pliers. The one-piece dental tool is advantageous as it provides a device which is able to be easily inserted and manipulated within a patient's mouth to pry a dental covering from an underlying surface. The tool is also beneficial by eliminating compression forces about the dental covering and thus reducing damage to the dental covering or adjacent teeth.

Notwithstanding the above, there is still a need for tooling which can cooperate with a one-piece dental tool to improve a dental operator's access into a patient's mouth while still providing tooling and visual access, providing a comfortable patient experience, and preventing damage to either or both a dental covering and underlying surface.

SUMMARY

The present disclosure relates to a handling device comprising: a) a body having an elongated shape configured to receive a prying load from an operator; b) one or more receptacles through the body configured to retain at least a portion of a dental tool and allow an engagement portion of the dental tool to project therefrom substantially perpendicular to a longitudinal axis of the body; wherein the engagement portion is adapted to contact a portion of a dental covering along only one of a facial side or a lingual side of the dental covering and by being wedged between a gum-line and the dental covering; and wherein the one or more receptacles are configured to transfer the prying load from the body to the engagement portion of the dental tool.

The present disclosure further relates to a dental tool assembly comprising: a) a handling device having: i) a body having an elongated shape configured to receive a prying load from an operator; ii) one or more receptacles through the body which pass from one exterior surface to an opposing exterior surface; b) one or more dental tools, each having: i) a load applying portion which is adapted to rest upon an adjacent surface relative to a dental covering; ii) an engagement portion which tapers to a smaller thickness toward one or more lateral ends and adapted to contact a portion of the dental covering along only one of a facial side or a lingual side of the dental covering and by being wedged between a gum-line and the dental covering, iii) an intermediate portion which is integral with and adjacent to both the engagement portion and the load applying portion to bridge the load applying portion and the engagement portion, wherein a width of the intermediate portion is smaller than a width of both the load applying portion and the engagement portion, and wherein the intermediate portion is transverse to both the engagement portion and the intermediate portion; wherein the one or more dental tools are located within the one or more receptacles, and the one or more receptacles are configured to transfer the prying load from the body to the engagement portion of the dental tool.

The handling device and dental tool assembly of the disclosure may provide a handle adapted to receive a one-piece dental tool. The handling device and dental tool may allow for access into a patient's mouth to remove a dental covering while simultaneously allowing for visual access. The handling device may provide for a comfortable patient experience by distancing a hand of a dental operator away from a mouth of a patient. The handling device when used together with a dental tool as a dental tool assembly may provide for a means of controlling the dental tool for removal of a dental covering, while preventing damage to the dental covering and/or underlying surface.

BRIEF DESCRIPTION OF DRAWINGS

FIG. 16 is a perspective view of a dental tool with a handling device according to the teachings herein.

FIG. 17 is a perspective view of a dental tool with a handling device according to the teachings herein.

FIG. 18 illustrates a cutout in the dental tool according to the teachings herein.

FIG. 19 illustrates an extension of the dental tool according to the teachings herein.

FIG. 20 illustrates a notch in the dental tool according to the teachings herein.

FIG. 21 is a perspective view of a dental assembly applied to a hemostat according to the teachings herein.

FIG. 22 is a side view of a hemostat including the dental tool according to the teachings herein.

FIG. 23A is a perspective view of a dental assembly removing a dental covering from a mouth of a patient according to the teachings herein.

FIG. 23B is a side view of a dental tool removing a dental covering from a mouth of a patient according to the teachings herein.

DETAILED DESCRIPTION

Figure 1:
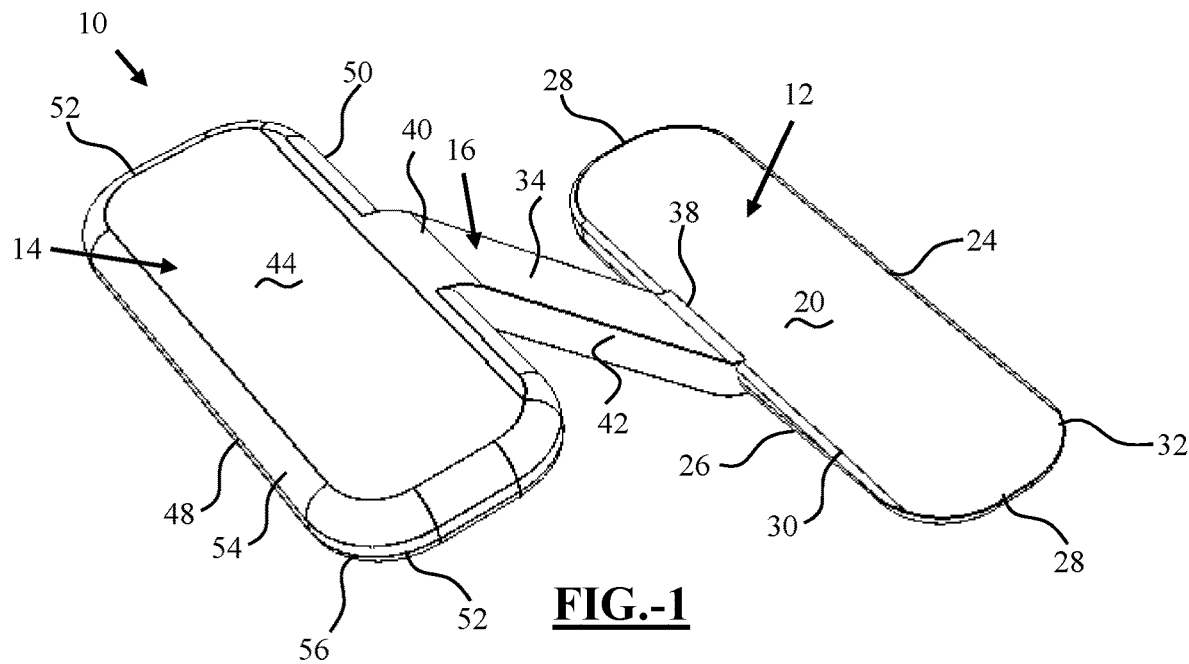
FIG. 1 is a perspective view of a dental tool according to the teachings herein.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Dental Tool Assembly

The teachings herein provide for a dental tool assembly, a method of assembling the dental tool assembly, a method of using the assembly, and a method for removing a dental covering. The dental tool assembly may include a dental tool, handling device, or both. The dental tool assembly may have a dental tool assembled to a handling device, integral with a handling device, or both.

The dental tool assembly, dental tool, and handling device of the disclosure may find particular use for removal of a dental covering. A dental covering may include any type of dental restoration, inlay, overlay, or the like. A dental covering may include a temporary crown, a permanent crown, a dental bridge, a dental brace, a dental veneer, an artificial tooth, or any combination thereof. A dental covering may be affixed or adhered to an underlying tooth or post with a temporary or short term dental adhesive. A dental covering may be for a human or animal tooth. The device of the disclosure may be configured to contact a portion of the dental covering for removal. A portion of the dental covering may include an extremity of the dental covering. An extremity of the dental covering may include an exterior side surface, an exterior surface adjacent a patient's gum line, or both. The portion of the dental covering may be part of the facial side, lingual side, or both. The assembly and/or devices of the disclosure may be configured to rest on an adjacent surface to the dental covering to remove the dental covering. An adjacent surface may include any surface adjacent the dental covering. An adjacent surface may include an adjacent tooth. An adjacent tooth may include a tooth, a dental covering, a dental prosthetic, the like, or any combination thereof Dental Tool Handling Device The teachings herein provide for a handling device, a method of using the handling device with a dental tool, and a method for removing a dental covering. The handling device may be a simple tool which is relative easy to use in conjunction with a dental tool to then insert into a mouth of a patient and easy to manipulate once inserted. The handling device may be particularly advantageous by providing extra leverage by distancing a prying force from a dental tool while preventing damage to a dental covering and maintaining visibility within a mouth of a patient. The handling device may include a body having a substantially elongated shape. The length of the body allows for the prying force to be distanced from the dental tool, this allowing for increased torque to be applied at the dental covering. The handling device may include one or more receptacles configured to engage (e.g., by receiving) a dental tool. The dental tool may be a tool similar to the tool disclosed in U.S. Pat. No. 9,687,316, incorporated herein in its entirety for all purposes. The handling device may include only a single grip surface or a plurality of grip surfaces. For example, the handling device may be generally rod shaped, solid, include a single grip surface, or any combination thereof. The handling device may include one portion, two portions, a pivot joint, more than one grip surface, or any combination thereof. Two portions may be connected via a pivot joint. An example of more than one grip surface or two portions may be two grip handle grips rotationally mated at a pivot joint. For example, the handle may be a hemostat, dental pliers, dental forceps, or the like. A pivot joint may allow a distance between an engagement portion and load applying portion to be adjusted. By adjusting the distance, the pivot joint may allow the device to be adjusted for varying heights of dental coverings. The handling device may be engaged to, assembled with, or even integral with any portion of the dental tool.

A handling device may be separate from or integral with a dental tool. The handling device may be separate or integral with a load applying portion, intermediate portion, engagement portion, or a combination thereof. The handling device may extend from the load applying portion, the intermediate portion, the engagement portion, or a combination thereof. The handling device may extend in a generally opposing direction from the load applying portion as the engagement portion. By extending away from the engagement portion, the handling device may extend the assembly outside of a patient's mouth. By extending the device outside of a patient's mouth, the handle may facilitate manipulation of the dental tool provide a less obstructed view, or both. The handling device may include at least one grip, two grips, or more. The one or more grips may make the handling device more ergonomic for use by a user's hand (e.g., larger grip surface, cushion, finger openings, etc.).

The handling device includes one or more bodies. The body functions as the main portion of the handling device, a gripping portion of the handling device, the structure which is able to receive and transfer a prying force, or any combination thereof. The body may have any size, shape, and/or configuration suitable for engaging with a dental tool, receiving a prying force, and/or transferring a prying force. The body may be substantially solid, partially solid, partially hollow, substantially hollow, or any combination thereof. Two or more bodies may be used in conjunction together, such as being connected by a pivot joint. The body may have any suitable shape for retaining a dental tool and being inserted into a mouth of a user. The body may include one or more exterior surfaces. The one or more exterior surfaces may provide one or more grip surfaces. The body may be substantially rod-shaped, cylindrically-shaped, cuboid-shaped, the like, or a combination thereof. Ends of the body may be shaped to avoid sharp edges and points within a mouth of a patient. For example, one or both ends of a body may be rounded. The body may have a width. A width may be substantially perpendicular to a longitudinal axis of the body. A width may be parallel to a width of one or more dental tools when engaged therein. A width may be generally perpendicular to a plane which intersects through the midpoint. The width may be less than or equal to a width of one or more portions of a dental tool. A width may be less than a width of an engagement portion, load applying portion, or both of a dental tool. A width of the body may allow for a dental tool to extend outside of the body when paired therewith. A width may be substantially constant, expand, taper, or a combination thereof. The body may be substantially straight, have one or more bends, one or more contours, or any combination thereof. The body may have or be free of one or more elbows, receptacles, contoured ends, position indicators, or any combination thereof.

The body may include one or more elbows. The one or more elbows may allow for the body to have one or more curved contours, allow for clearance between the body and a lip or other tissue surface of a mouth of a patient, provide an ergonomic hand grip surface, or any combination thereof. The one or more elbows may be formed as one or more bends along a body of the handling tool. The one or more elbows may be arcuate, a straight angle bend (e.g., having a point apex), sinusoidal, the like, or any combination thereof. One or more planes may intersect through the one or more elbows. The handling device may be substantially symmetrical or asymmetrical about a plane passing through the one or more elbows. The one or more elbows may provide for one or more ends of the body angling toward one another, away from another, extending away from each other, or any combination thereof. The one or more elbows may form an acute, perpendicular, and/or obtuse angle between one or more portions of a body. Opposing ends of a body may angle toward one another at a substantially obtuse angle. The one or more elbows may form an angle of about 90 degrees or greater, about 120 degrees or greater, about 140 degrees or greater, or even about 150 degrees or greater between opposing ends of the body. The one or more elbows may form an angle of about 180 degrees or less, about 170 degrees or less, or even about 160 degrees or less between opposing ends of the body. The one or more elbows may be located along any length of the body. The one or more elbows may be located substantially halfway along a length of the body, biased toward one or more ends of a body, or both. The one or more elbows may be located between a plurality of receptacles.

The body may include one or more receptacles. The one or more receptacles may function to engage a dental tool, provide a contact surface to transfer a prying load from a body to a dental tool, or both. The one or more receptacles may be located anywhere along a length of the body. One or more receptacles may be biased toward one or more ends of a body, at one or more ends of a body, off-center, centered, or any combination thereof. The one or more receptacles may have any size or shape suitable for engaging one or more portions of a dental tool. The one or more receptacles may be reciprocal with at least part of one or more portions of a dental tool. Any of the features useful or attributed to the dental tool may be implemented in the one or more receptacles. These features of the dental tool may be applied in the inverse to the one or more receptacles. For example, a height of the one portions of the dental tool may be a height or distance between one or more upper and lower surfaces of the receptacle. As another example, one or more contours, angles, or both in a dental tool may be formed by the surfaces of the one or more receptacles. The one or more receptacles may include one or more cavities. A plurality of more cavities may be in direct communication with one another to form a larger cavity or may be segregated from one another to form separate cavities within the body. Each cavity may be dedicated to receiving and/or engaging a portion of a dental tool. A plurality of cavities may include a load applying portion cavity, an engagement portion cavity, an intermediate portion cavity, or a combination thereof. A cavity of a receptacle may be formed through an entire thickness of the body (e.g., extend entirely from one exterior surface to an opposing exterior surface), formed through only a portion of a thickness (e.g., extend partially from an exterior surface into the body), or a combination of both. One or more cavities of a receptacle may pass through an entire thickness of a body while one or more cavities may only partially pass through a thickness of a body. The one or more receptacles may engage at least a portion of a dental tool with a press fit, friction fit, lock fit, threaded fit, snap fit, cantilever snap fit, annular snap fit, a channel fit, the like, or any combination thereof. The one or more receptacles may have a geometry similar and/or reciprocal to all or a portion of a dental tool. The similar and/or reciprocal geometry may provide for a friction fit or lock fit with at least a portion of a dental tool. The one or more receptacles may be formed as a channel within the body. The channel may include a track channel, slot, the like, or a combination of both. The one or more receptacles may include a single receptacle or a plurality of receptacles. A plurality of receptacles may include two or more receptacles. The one or more receptacles may include one or more features of a receptacle as disclosed in U.S. Pat. No. 9,687,316.

The one or more receptacles may include an engagement portion cavity. The engagement portion cavity may function to receive and retain an engagement portion of a dental tool, transfer a prying load from a body to the engagement portion of the dental tool, allow for one or more lateral ends of an engagement portion to protrude away from the body, or a combination thereof. The engagement portion cavity may be configured so that the engagement portion of the dental tool resides within the cavity while extending outside of the cavity. The engagement portion cavity may be integral, directly connected, continuous, or separate from one or more other cavities of a receptacle. The engagement portion cavity may be in direct communication with an intermediate portion cavity, a load applying portion cavity, a position identifier, or any combination thereof. The engagement portion cavity may have a shape substantially reciprocal or inverse to a shape or geometry of an engagement portion of a dental tool. The load applying portion cavity may be rectangular, square, oblong, elliptical, polygonal, the like, or any combination thereof. The shape of the cavity may refer to a cross-sectional shape (e.g., 2-dimensional, parallel or perpendicular to the opposing surfaces). The engagement portion cavity may be substantially straight such that a substantial length of the engagement portion cavity is parallel with and/or lies within a single plane. The engagement portion may include one or more curves or have a curved profile. A curved profile may be S-shaped, C-shaped, V-shaped, W-shaped, U-shaped, the like, or any combination thereof. The profile of the engagement portion cavity may be reciprocal to a profile (e.g., cross-section) of a dental tool, such as at the engagement portion. The engagement portion cavity may be substantially symmetrical about a longitudinal axis or longitudinal plane of the handling device or may be asymmetrical. The engagement portion cavity may have an upper surface and a lower surface.

The engagement portion cavity may include an upper surface. The upper surface may include a generally curved, arcuate, plate-like, and/or flat surface. The upper surface, plate like surface, or both may be generally parallel to and distanced from an upper surface of the load applying portion cavity, a plate like or flat surface of the load applying portion cavity, or both. The upper surface may or may not be substantially uniform (i.e. smooth) or non-uniform. The upper surface may be reciprocal with, inverse from, similar to, or a combination thereof a lower surface of the engagement portion cavity. The upper surface may include contouring (i.e., bowing, curving, cut-outs, notches) to engage with or match a contour of dental tool, such as an engagement portion. The upper surface may be substantially reciprocal (e.g., inverse) with an upper surface of an engagement portion of a dental tool. The upper surface may oppose the lower surface of the engagement portion cavity, merge or abut to a lower surface of the engagement portion cavity, form an end of the receptacle, or any combination thereof.

The engagement portion cavity may include a lower surface. The lower surface may include a generally curved, arcuate, plate-like, and/or flat surface. The lower surface may be generally opposed to the upper surface of the engagement portion cavity. The lower surface may be generally parallel, at an angle, or both to the upper surface. A portion of the lower surface may be generally parallel to the upper surface. A portion of the lower surface may be opposing and at an angle to the upper surface. For example, at one or more ends, the engagement portion cavity may taper to a smaller thickness. A tapered thickness may allow for engaging any tapered or beveled portions of a dental tool or may be substantially reciprocal to these surfaces of a dental tool. The tapered thickness may be where an upper surface angles toward a lower surface, a lower surfaces angles toward an upper surface, or both. The lower surface may be substantially uniform (i.e. smooth). The lower surface may include contouring (i.e., bowing, curving, cut-outs, notches) to engage with a dental tool. The lower surface may have a shape substantially reciprocal with a lower surface of an engagement portion of a dental cavity.

The engagement portion cavity may have a thickness. The thickness may also be referred to as a height. The thickness may be the distance between the upper surface and the lower surface. The thickness may provide allow for receiving and engaging an engagement portion of a dental tool. The thickness may be substantially uniform, may expand or taper towards one or more ends, may taper or expand toward lateral ends, or a combination thereof. The thickness may be less than, equal to, or greater than a thickness of an engagement portion of a dental tool. The thickness may allow for placement and/or engagement of an engagement portion of a dental tool therein. The thickness may be from about 0.05 mm or greater, about 2 mm or greater, or even about 6 mm or greater. The thickness may be from about 12 mm or less, about 10 mm or less, or even about 8 mm or less.

The device may include a load applying portion cavity. The load applying portion cavity may function to retain a load apply portion of a dental tool, transfer at least part of the prying force to the load applying portion, allow for one or more lateral ends of a load applying portion to protrude away from the body, or a combination thereof. The load applying portion cavity may be configured to be pivoted upwardly or downwardly by application of the prying load onto the handle device. The load applying portion cavity may receive a prying load from a user via the handle device. The load applying portion cavity may transfer the prying load to the load applying portion of a dental tool. The load applying portion cavity may have any size or shape suitable for engaging and receiving a load applying portion of a dental tool. The load applying portion cavity may have a shape substantially reciprocal or inverse to a shape or geometry of a load applying portion of a dental tool. The load applying portion cavity may be rectangular, square, oblong, elliptical, polygonal, the like, or any combination thereof. The shape may refer to a cross-sectional shape of the cavity. The load applying portion cavity may be substantially straight such that a substantial length of the load applying portion cavity is parallel with and/or lies within a single plane. The load applying portion may include one or more curves or have a curved profile. A curved profile may be S-shaped, C-shaped, V-shaped, W-shaped, U-shaped, the like, or any combination thereof. The profile of the load applying portion cavity may be reciprocal to a profile (e.g., cross-section) of a dental tool, such as at the load applying portion. The load applying portion cavity may be substantially symmetrical about a longitudinal axis or longitudinal plane of the handling device or may be asymmetrical. The load applying portion may be located anywhere along a length of a body of the handling device. The load applying portion cavity may be biased toward a mid-point, an end, or both of the body. For example, one or more load applying portion cavity may be formed at one or more ends of a body of a handling device when only a load applying portion is received within the receptacle. As another example, one or more load applying portion cavities may be biased closer toward a midpoint of a body than an intermediate portion cavity, engagement cavity, or both when the receptacle receives two or more portions of the dental tool. The load applying portion cavity may have an upper surface and a lower surface.

The load applying portion cavity may include an upper surface. The upper surface may include a generally curved, arcuate, plate-like, and/or flat surface. The upper surface, plate like surface, or both may be generally parallel to and distanced from an upper surface of the engagement portion cavity, a plate like or flat surface of the engagement portion cavity, or both. The upper surface may be substantially uniform (i.e. smooth) or non-uniform. The upper surface may be reciprocal with, inverse from, similar to, or a combination thereof to a lower surface of the load applying portion cavity. The upper surface may include contouring (i.e., bowing, curving, cut-outs, notches) to engage or match a contour of a load applying portion of a dental tool. The upper surface may be substantially reciprocal (e.g., inverse) with an upper surface of a load applying portion of a dental tool. The upper surface may oppose the lower surface of the load applying portion cavity, merge or abut to a lower surface of the load applying portion cavity, form an end of the receptacle, or any combination thereof.

The load applying portion cavity may include a lower surface. The lower surface may include a generally curved, arcuate, plate-like, and/or flat surface. The lower surface may be generally opposed to the upper surface of the load applying portion cavity. The lower surface may be generally parallel, at an angle, or both to the upper surface. At least a portion of the lower surface may be generally parallel to the upper surface. For example, a mid-section of the lower surface may be generally parallel to a midsection of the upper surface. A portion of the lower surface may be opposing and at an angle to the upper surface. For example, at one or more ends, the load applying portion cavity may taper to a smaller thickness. A tapered thickness may allow for engaging any tapered or beveled portions of a dental tool or may be substantially reciprocal to these surfaces of a dental tool. The tapered thickness may be where an upper surface angles toward a lower surface, a lower surfaces angles toward an upper surface, or both. The lower surface may be substantially uniform (i.e. smooth). The lower surface may include contouring (i.e., bowing, curving, cut-outs, notches) to engage with a dental tool. The lower surface may have a shape substantially reciprocal with a lower surface of a load applying portion of a dental cavity.

The load applying portion cavity may have a thickness. The thickness may be the distance between the upper surface and the lower surface. The thickness may be substantially uniform, may taper towards one or more distal ends, may taper or expand toward one or more lateral ends the load applying portion cavity, or any combination thereof. The thickness may be from about 0.05 mm or greater, about 2 mm or greater, or even about 6 mm or greater. The thickness may be from about 12 mm or less, about 10 mm or less, or even about 8 mm or less. The load applying portion cavity may have a length and a width. The load applying portion may be connected to an intermediate portion cavity.

The one or more receptacles may include an intermediate portion cavity. The intermediate portion cavity may function to receive and retain an intermediate portion of a dental tool, limit movement (e.g., lateral movement) of a dental tool relative to the handling device, or both. The intermediate portion cavity may be configured to bridge the engagement portion cavity and the load applying portion cavity. The intermediate portion cavity may be continuous or discontinuous with the engagement portion cavity, the load applying portion cavity, or both. The intermediate portion cavity may be rectangular, square, oblong, elliptical, polygonal, the like, or any combination thereof. The shape may refer to a cross-sectional shape of the cavity (e.g., 2-dimensional). The intermediate portion cavity may have a shape substantially reciprocal or inverse to a shape or geometry of an intermediate portion of a dental tool. The intermediate portion cavity may have one or more shapes reciprocal with one or more reinforcement structures of an intermediate portion of a dental tool. The intermediate portion cavity may be substantially symmetrical about a longitudinal axis or longitudinal plane of the handling device or may be asymmetrical.

The intermediate portion cavity may have an upper surface and a lower surface. The upper surface of the intermediate portion cavity may be integral or extend from at least a portion of the upper surface of the engagement portion cavity, the load applying portion cavity, or both. The lower surface of the intermediate portion cavity may be integral or extend from at least a portion of lower surface of the engagement portion cavity, the load applying portion cavity, or both. The intermediate surfaces of the intermediate portion cavity may be substantially transverse to the surfaces of a load applying portion cavity, engagement portion cavity, or both. The upper and/or lower surfaces of the intermediate portion cavity may have one or more of the features described for the upper and lower surfaces of other cavity portions of the receptacle (e.g., contouring, smooth, bowed, etc.).

The intermediate portion cavity may have a thickness. The thickness may be the distance between the upper surface and the lower surface of the intermediate portion cavity. The thickness may be substantially uniform, may be non-uniform, may taper and/or expand towards lateral sides of the intermediate portion cavity, may taper and/or expand toward one or more ends of the intermediate portion cavity (e.g., in proximity/adjacent to the load applying portion cavity, engagement portion cavity), or any combination thereof. The thickness may be about less than, equal to, or greater than a thickness of an intermediate portion of a dental tool. The thickness may at least include portions with a thickness greater than, equal to, or less than the thickness of the load applying portion cavity, the engagement portion cavity, or both. The thickness may be from about 0.05 mm or greater, about 2 mm or greater, or even about 6 mm or greater. The thickness may be from about 12 mm or less, about 10 mm or less, or even about 8 mm or less. A midpoint of a receptacle may be located along a length of the intermediate portion cavity. The midpoint may be halfway along the length of the intermediate portion cavity or may be off-set.

The intermediate portion cavity may be substantially straight, curved, or both. The intermediate portion cavity may be substantially straight such that a substantial length of the intermediate portion cavity is parallel with and/or lies within a single plane. The intermediate portion may include one or more curves or have a curved profile. A curved profile may be S-shaped, C-shaped, V-shaped, W-shaped, U-shaped, the like, or any combination thereof. The profile of the intermediate portion cavity may be reciprocal to a profile (e.g., cross-section) of a dental tool. The intermediate portion cavity and/or the plane may be transverse to at least a portion of the engagement portion cavity, load applying portion cavity, or both. The intermediate portion cavity may be transverse to an upper surface, lower surface, or both of a load applying portion cavity, engagement portion cavity, or both. The load applying portion cavity and/or the engagement portion cavity may project away from the intermediate portion cavity, a plane within a substantially parallel to the intermediate portion cavity, or both. The intermediate portion cavity may be transverse with at least a portion of the engagement portion cavity, the load applying portion cavity, or both so as to form alternate exterior angles. An alternate exterior angle may be formed by the lower surface of the load applying portion cavity and the lower surface of the intermediate portion cavity. An alternate exterior angle may be formed by the upper surface of the engagement portion cavity and the upper surface of the intermediate portion cavity, or both. The alternate exterior angles may be obtuse. The alternate exterior angles may be about 90 degrees or greater, about 110 degrees or greater, or even about 120 degrees or greater. The alternate exterior angles may be about 150 degrees or less, about 140 degrees or less, or even about 135 degrees or less.

The one or more receptacles may include one or more retaining features. The one or more retaining features may function to limit movement of a dental tool within a handling device. The one or more retaining features may allow for a dental tool to be inserted and oriented in one or more positions within the one or more receptacles. The one or more retaining features may have any configuration to limit movement of a dental tool within the handling device. The one or more retaining features may include one or more walls, grooves, notches, tabs, threaded surfaces, the like, or any combination thereof within one or more receptacles. The one or more retaining features may include one or more walls. The one or more walls may be formed by the same or a different material as the body. The one or more walls may be integral or separate from and affixed to the body. The one or more walls be even with one or more exterior surfaces of a body or offset from one or more exterior surfaces of a body. The one or more walls may be located within one or more cavities of a receptacle. The one or more walls may be located within an intermediate portion cavity. The one or more walls may extend all or a portion of a length of an intermediate portion cavity. The one or more walls may be centered with or off-set from a longitudinal axis of the handling device. The one or more walls may be referred to as an intermediate stop wall. The one or more walls may extend from one surface to an opposing surface of one or more cavities. The one or more walls may extend from an upper surface to a lower surface of an intermediate portion cavity. The one or more walls may provide for a dental device to be offset or skewed to one side of the handling device. The one or more walls may provide for ambidextrous use of the handling device relative to a dental tool.

The handling device may include one or more position indicators. The one or position indicators may function to communicate to a user (e.g, dental physician) in which direction a handling device having a dental tool therein is able to be used within a mouth of a patient, engagement of a dental tool with a handling device, or both. The one or more position indicators may include one or more openings. The one or more openings may open toward and into one or more receptacles. The one or more openings may provide a visual of a dental tool being located within the handling device. The one or more position indicators may indicator what exterior surface is pointing toward a user of the device. The one or more position indicators may indicate which director to insert the handling device into a mouth of a user. The one or more position indicators may include one or more characters of text, images, the like, or both.

A handling device may include at least one connecting portion. The connecting portion may be at an opposite end of the handling device as the grip, same end which engages with a dental tool, or both. The connecting portion may function to mate the handling device with any portion of the device. The connecting portion may mate the handling device with the load applying portion. The connecting portion may have an exterior geometry to engage and be retained within a receptacle of the load applying portion. The connecting portion may be used in lieu of a receptacle. For example, the connecting portion may be threaded, include a tab, have similar and reciprocal geometry to the shape of a receptacle, include a channel or channel track, or the like.

A handling device may include one or more tips, the tips may be part of the dental tool, the dental tool assembly, or a combination thereof. The one or more tips may be formed as ends of each portion of body of a handling device. For example, the one or more tips may be a first tip and a second tip of a hemostat, pliers, forceps, or the like. The first tip and the second tip may be received within one or more receptacles. For example, the first tip may be received within a first receptacle (i.e., receptacle in the load applying portion). For example, the second tip may be received within a second receptacle (i.e., receptacle in the engagement portion). Assembly of the tips of the body into one or more dental tools may be dental tool assembly. The tips may have one or more portions of a dental tool integrated therein. For example, one tip may have an engagement portion formed therein. For example, another tip may have a load applying portion formed therein. The one or more tips may be moveable toward and away from each other via one or more joints. The one or more joints may be part of an intermediate portion. The intermediate portion may thus be part of the handling device, the dental tool, or both. One or more grips which allow for a joint to be moved may function as a handling device.

The handling device may include one or more features for preventing discomfort, damage and/or injury in a mouth of a patient. The intermediate portion, the engagement portion, the load applying portion, or any combination thereof may include beveled or rounded edges. The rounded edges may help prevent the device from cutting or uncomfortably pressing share edges into tissue of a patient's mouth. The handling device may include one or more coatings. The coatings may allow for the handling device to be easily moved within a mouth of a patient, reduce friction with tissue of a patient, or both.

Dental Covering Removal Tool

The present disclosure provides for a device (e.g., dental tool). The device may be a simple tool which is relatively small, easy to insert into a mouth of a patient, and easy to manipulate once inserted into a mouth of the patient. The device may include a portion (e.g., a load applying portion, a handle, or both) to easily control and manipulate the device by an operator. The device may work in conjunction with a handling device, may work without an additional handling device, or both. For example, a handling device may be assembled with the device to allow for easier access or visibility further back into a mouth of a patient. At least a portion of the device may be disposable to allow for single use. The device may include a portion (i.e., load applying portion) which may rest within a surface in a mouth of a patient. The device may include a portion (e.g. an engagement portion) to contact and pry the dental covering off from an underlying surface. A portion (e.g., such as the engagement portion) may include a projection, wedge, cut-out, tapered thickness, or any combination thereof to easily locate the device in direct contact with the dental covering, apply the pry force, or both. The device may include one or more portions (i.e., load applying portion and/or intermediate portion) and/or surfaces which function as a fulcrum. The device may allow an operator to hold the device, applying a prying load, and pivot about the fulcrum. By pivoting about the fulcrum, the prying load may transfer to a portion (i.e., engagement portion) to pry the dental covering from the underlying surface.

The disclosure relates to a device for removing a dental covering. The device may be a unitary structure or a multi-piece structure. The device includes an engagement portion and a load applying portion. The engagement portion may be configured to contact a portion of the dental covering along only one of a facial side or a lingual side of the dental covering and receive a prying load applied by an operator. The load applying portion may be connected to the engagement portion. The load applying portion may be adapted to rest upon an adjacent surface relative to the dental covering. The load applying portion may be adapted to be pivoted upwardly or downwardly by application of a prying load.

The device may include an intermediate portion. The intermediate portion may connect the load applying portion and the engagement portion. The intermediate portion may be configured to bridge the engagement portion and the load applying portion to impart a torque force on the engagement portion from the load applying portion. The intermediate portion may provide clearance so the intermediate portion substantially avoids contact with any teeth or tissue adjoining the dental covering.

The device has an overall size. The overall size may allow the device to be sufficiently small to allow a plurality of devices to be stored within a dental office while utilizing minimal space. The overall size may allow the device to be efficiently packaged for shipping and/or storage. The overall size may allow the device to be inserted into a mouth of a patient while helping to prevent patient discomfort due to the size of the device. The overall size of the device may include a length, width, and height of the device. The length of the device may be a distance along a longitudinal axis, from a rear end to a front end, or both. The rear end may be a rear end of the load applying portion, a rear end of a handle, or both. A front end may be a front end of an engagement portion, a front end of a handle, a front end of a tip, or any combination thereof. The length of the device may be about 15 mm or greater, about 20 mm or greater, about 50 mm or greater, or even about 75 mm or greater. The length of the device may be about 200 mm or less, about 175 mm or less, about 150 mm or less, or even about 125 mm or less. The width of the device may be a distance generally perpendicular to a longitudinal axis, from one lateral end to another lateral end, or both. The width of the device may be about 9 mm or greater, about 13 mm or greater, or even about 20 mm or greater. The width of the device may be about 40 mm or less, about 35 mm or less, or even about 30 mm or less. The height of the device may be the distance from an upper surface to a lower surface, an engagement portion to a load applying surface, one end of a handle to another end of a handle, or any combination thereof. The height of the device may be about 10 mm or more, about 15 mm or more, or even about 20 mm or more. The height of the device may be about 75 mm or less, about 50 mm or less, or even about 30 mm or less.

The device includes a longitudinal axis. The longitudinal axis may generally extend from at least a portion of the load applying portion to at least a portion of the engagement portion. The device may include a longitudinal plane. The longitudinal plane may pass through the longitudinal axis. The longitudinal plane may be generally perpendicular to an upper surface of the engagement portion, an upper surface of the load applying portion, or both.

The device may be substantially symmetrical about the longitudinal axis, the longitudinal plane, or both. The device may be sufficiently symmetrical about the longitudinal axis, the longitudinal plane, or both to allow for ambidextrous use of the device. Ambidextrous use may include the device being adapted for use (i.e., application of a prying load) by a user's left hand or right hand. Ambidextrous use may include the device is adapted for removing a dental covering in an upper jaw, lower jaw, right side of a jaw, and/or left side of a jaw. Ambidextrous use may include the device is adapted for removing a dental covering in any of the four quadrants of a patient's mouth. Ambidextrous use may include contacting only one of a facial side or a lingual side of a dental covering with the engagement portion.

The device may include a transverse plane. The transverse plane may be generally parallel to the longitudinal axis, generally perpendicular to the longitudinal plane, or both. Generally parallel and generally perpendicular may include slight differences in degrees due to manufacturing tolerances (i.e., up to +/−15 degrees). The transverse plane may be generally parallel to at least a portion of the load applying portion, the engagement portion, or both. The transverse plane may be generally parallel to an upper surface of the load applying portion, the engagement portion, or both. The transverse plane may intersect a midpoint of the device. The midpoint may be located along the length of the intermediate portion. The engagement portion may be on an opposing side of the transverse plane as the load applying portion. The intermediate portion may be transverse to the transverse plane.

The device includes an engagement portion. The engagement portion may function to receive a prying load, apply a prying load, remove a dental covering, or any combination thereof. The engagement portion may be configured to contact a portion of a dental covering. The engagement portion may remove the dental covering by being wedged in between the dental covering and a patient's gum line. After being wedged, the engagement portion may apply or transfer a prying load to the dental covering. While applying or transferring the prying load to the dental covering, the engagement portion may lift or separate the dental covering from the underlying surface. The engagement portion may have any size or shape suitable for contacting a dental covering, removing a dental covering, receiving a prying load, applying a prying load, or any combination thereof. The engagement portion may be rectangular, square, oblong, elliptical, polygonal, the like, or any combination thereof. The engagement portion may be integral with or separate from a handle. The engagement portion may have an upper surface and a lower surface.

The engagement portion includes an upper surface. At least a portion of the upper surface may function to come into direct contact with the dental covering, apply the prying load to the dental covering, pry the dental covering from an adhering surface or any combination thereof. The upper surface may include a generally plate like surface (i.e., first flat plate portion). The upper surface, plate like surface, or both may be generally parallel to and distanced from an upper surface of the load applying portion, a plate like surface of the load applying portion, or both. The upper surface may be substantially uniform (i.e. smooth). The upper surface may include contouring (i.e., bowing, curving, cut-outs, notches) to engage with the dental covering. The upper surface opposes the lower surface of the engagement portion.

The engagement portion includes a lower surface. The lower surface may be generally parallel, at an angle, or both to the upper surface. A portion of the lower surface may be generally parallel to the upper surface. For example, a midsection of the lower surface may be generally parallel to a midsection of the upper surface. A portion of the lower surface may be opposing and at an angle to the upper surface. For example, at one or more lateral ends, the engagement portion may taper to a smaller thickness. At a smaller thickness, the lower surface may be at an angle to the upper surface. A tapered thickness may allow one or more lateral ends to wedge between a dental covering and a gum-line. The lower surface may be curved with a radius. The lower surface may curve toward one or both of the lateral ends. The radius and/or curve of the lower surface may provide a rocking surface when a prying load is applied to the device. The rocking surface may assist in providing user comfort when the dental covering is pried from an underlying surface.

The engagement portion may have a thickness. The thickness may be the distance between the upper surface and the lower surface. The thickness may be substantially uniform, may taper towards one or more outside edges of the engagement portion, or may expand towards one or more outside edges of the engagement portion. The thickness may be from about 0.05 mm or greater, about 2 mm or greater, or even about 6 mm or greater. The thickness may be from about 12 mm or less, about 10 mm or less, or even about 8 mm or less. The engagement portion may have a length and a width. The length of the engagement portion may be the distance measured from edge to edge, generally parallel to a longitudinal axis of the device, distance from a front end to a rear end, a distance from an end opposing an end integrated with an intermediate portion, or any combination thereof. The length of the engagement portion may be about 5 mm or greater, 7 mm or greater, or even 9 mm or greater. The length of the engagement portion may be about 20 mm or less, about 18 mm or less, or even 14 mm or less. The width of the engagement portion may be the distance measured from a lateral edge to an opposing lateral edge, generally perpendicular to the longitudinal axis of the device or both. The width of the engagement portion may be greater than, equal to, or less than a width of the intermediate portion, load applying portion, or both. The width of the engagement portion may or may not include one or more extensions extending from the engagement portion. The width of the engagement portion may be about 9 mm or greater, about 13 mm or greater, or even about 20 mm or greater. The width of the engagement portion may be about 40 mm or less, about 35 mm or less, or even about 30 mm or less.

The engagement portion may be connected to an intermediate portion, a load applying portion, a handle, or any combination thereof. The engagement portion may include one or more receptacles. A receptacle of the engagement portion may cooperate or mate with a handle. The engagement portion may be generally parallel to a load applying portion. For example, an upper surface of the engagement portion may be generally parallel to an upper surface of a load applying portion.

The engagement portion may include an off-set extension. The off-set extension may function to come into direct contact with the dental covering, apply the prying load to the dental covering, pry the dental covering from an adhering surface, or any combination thereof. The off-set extension may be integral with the engagement portion, a handle, or both. The off-set extension may extend or protrude from a lateral side of the engagement portion. The off-set extension may have a thickness. The thickness may be measured as a distance between an upper and lower surface of the off-set extension. The off-set extension may be tapered. A tapered thickness may allow the off-set extension to wedge between a dental covering and a gum-line. The thickness may be about 0.2 mm or greater, about 0.4 mm or greater, or even about 0.5 mm or greater. The thickness may be about 5 mm or less, about 3 mm or less, or even about 2 mm or less. The off-set extension may have a width. The width may be the distance between a lateral end of the engagement portion to a lateral end of the off-set extension. The width of the off-set extension may be about 2 mm or greater, about 4 mm or greater, or even about 5 mm or greater. The width of the off-set extension may be about 10 mm or less, about 8 mm or less, or even about 6 mm or less.

The device includes a load applying portion. The load applying portion may function to receive a prying load, transfer a prying load, provide a grip surface, retain a handle portion, connect to an engagement portion, or any combination thereof. The load applying portion may be configured to rest upon an adjacent surface relative to the dental covering. The load applying portion may be configured to be held by a user. The load applying portion may be configured to engage and retain a handle. The load applying portion may be configured to be pivoted upwardly or downwardly by application of the prying load. The load applying portion may receive a prying load from a user. The load applying portion may transfer the prying load to the intermediate portion, the engagement portion, or both. The load applying portion may have any size or shape suitable resting upon an adjacent surface, receiving a prying load, transferring a prying load, or any combination thereof. The load applying portion may be rectangular, square, oblong, elliptical, polygonal, the like, or any combination thereof. The load applying portion may be substantially symmetrical about a longitudinal axis or longitudinal plane of the device or may be asymmetrical. The load applying portion may be integral or separate from a handle. The load applying portion may have an upper surface and a lower surface.

The load applying portion includes an upper surface. At least a portion of the upper surface may function to receive a prying load from a user, provide a grip surface, provide a load application surface, or any combination thereof. The upper surface may include a generally plate like surface (i.e., second flat plate portion). The upper surface, plate like surface, or both may be generally parallel to and distanced from an upper surface of the engagement portion, a plate like surface of the engagement portion, or both. The upper surface may be substantially uniform (i.e. smooth) or non-uniform. The upper surface may include contouring (i.e., bowing, curving, cut-outs, notches) to providing a resting surface for a finger of a user. The upper surface opposes the lower surface of the load applying portion.

The load applying portion includes a lower surface. The lower surface may be generally parallel, at an angle, or both to the upper surface. At least a portion of the lower surface may be generally parallel to the upper surface. For example, a mid-section of the lower surface may be generally parallel to a midsection of the upper surface. A portion of the lower surface may be opposing and at an angle to the upper surface. For example, towards one or more edges, the load applying portion may expand to a larger thickness. At a larger thickness, the lower surface may be at an angle to the upper surface. A larger thickness of the load applying portion may function to provide a larger grip or pinch surface for a user, house a receptacle, or both.

The load applying portion may have a thickness. The thickness may be the distance between the upper surface and the lower surface. The thickness may be substantially uniform, may taper towards one or more outside edges of the load applying portion, or may increase towards one or more outside edges of the load applying portion. The thickness may be from about 0.05 mm or greater, about 2 mm or greater, or even about 6 mm or greater. The thickness may be from about 12 mm or less, about 10 mm or less, or even about 8 mm or less. The load applying portion may have a length and a width. The length of the load applying portion may be the distance measured from edge to edge, generally parallel to a longitudinal axis of the device, the distance between a front end and a rear end of the load applying portion, the distance between an end connected to or integrated with an intermediate portion and an opposing end, or any combination thereof. The length of the load applying portion may be about 5 mm or greater, 7 mm or greater, or even 9 mm or greater. The length of the load applying portion may be about 20 mm or less, about 18 mm or less, or even 14 mm or less. The width of the load applying portion may be the distance measured from a lateral edge to an opposing lateral edge, generally perpendicular to the longitudinal axis of the device or both. The width of the load applying portion may be greater than, equal to, or less than a width of the intermediate portion, engagement portion, or both. The width of the load applying portion may be about 9 mm or greater, about 13 mm or greater, or even about 20 mm or greater. The width of the load applying portion may be about 40 mm or less, about 35 mm or less, or even about 30 mm or less. The load applying portion may be connected to an intermediate portion, an engagement portion, a handle, or any combination thereof.

The load applying portion may include one or more receptacles. A receptacle of the load applying portion may cooperate and/or mate with a handle. The load applying portion may include one or more grip features for aiding a user to grip the load applying portion. The one or more grip features may include dimples, indentations, non-slip material, the like, or any combination thereof. The load applying portion may be generally parallel to the engagement portion. For example, an upper surface of the load applying portion may be generally parallel to an upper surface of an engagement portion.

The device may include an intermediate portion. The intermediate portion may function to receive a prying load, transfer a prying load, connect an engagement portion with a load applying portion, provide clearance for the device to remove a dental covering, or any combination thereof. The intermediate portion may be configured to bridge the engagement portion and the load applying portion. The intermediate portion may be adapted to impart a torque force on the engagement portion from the load applying portion. The intermediate portion may transfer a prying load from the load applying portion to the engagement portion. The intermediate portion may provide a clearance. The clearance may allow the intermediate portion to substantially avoid contact with any teeth or tissue adjoining the dental covering. The clearance may allow at least a portion of the engagement portion to contact a dental covering, wedge between the dental covering and a gum-line, or both. The intermediate portion may be integral with or separate from the load applying portion, engagement portion, or both. The intermediate portion may be rectangular, square, oblong, elliptical, polygonal, the like, or any combination thereof. The intermediate portion may be substantially symmetrical about a longitudinal axis or longitudinal plane of the device or may be asymmetrical.

The intermediate portion may have an upper surface and a lower surface. The upper surface of the intermediate portion may be integral or extend from at least a portion of the upper surface of the engagement portion, the load applying portion, or both. The lower surface of the intermediate portion may be integral or extend from at least a portion of lower surface of the engagement portion, the load applying portion, or both.

The intermediate portion may have a thickness. The thickness may be the distance between the upper surface and the lower surface of the intermediate portion. The thickness may be substantially uniform, may be non-uniform, may taper towards one or more outside edges of the intermediate portion, may increase towards one or more outside edges of the intermediate portion, may be larger at or near areas with reinforcement structures, or any combination thereof. The thickness may at least include portions with a thickness greater than, equal to, or less than the thickness of the load applying portion, the engagement portion, or both. The thickness may be from about 0.05 mm or greater, about 2 mm or greater, or even about 6 mm or greater. The thickness may be from about 12 mm or less, about 10 mm or less, or even about 8 mm or less. The load applying portion may have a length and a width. The length of the load applying portion may be the distance measured from an end adjacent to or integral with the engagement portion to an end adjacent to or integral with the load applying portion. The length of the load applying portion may be about 5 mm or greater, 8 mm or greater, or even 10 mm or greater. The length of the load applying portion may be about 20 mm or less, about 18 mm or less, or even 15 mm or less. A midpoint of the device may be located along the length of the intermediate portion. The midpoint may be halfway along the length of the intermediate portion or may be off-set.

The width of the intermediate portion may be the distance measured from a lateral side to an opposing lateral side. The width of the intermediate portion may be greater than, equal to, or less than a width of the load applying portion, engagement portion, or both. Preferably, the width of the intermediate portion is substantially less (i.e., thinner) than both the load applying portion and the engagement portion. The difference in the widths between the intermediate portion from the load applying portion and the intermediate portion from the engagement portion may provide clearance for the intermediate portion. The width of the intermediate portion may be about 2 mm or greater, about 3 mm or greater, or even about 5 mm or greater. The width of the intermediate portion may be about 30 mm or less, about 25 mm or less, or even about 20 mm or less.

The intermediate portion may reside generally in a plane. The intermediate portion and/or the plane may be transverse to at least a portion of the engagement portion, load applying portion, or both. The intermediate portion may be transverse to a first plate portion of the engagement portion, a first plate portion of the load applying portion, or both. The load applying portion and/or the engagement portion may project away from the intermediate portion, the plane of the intermediate portion, or both. The intermediate portion may be transverse with at least a portion of the engagement portion, the load applying portion, or both so as to form alternate exterior angles. An alternate exterior angle may be formed by the lower surface of the load applying portion and the lower surface of the intermediate portion. An alternate exterior angle may be formed by the upper surface of the engagement portion and the upper surface of the intermediate portion, or both. The alternate exterior angles may be obtuse. The alternate exterior angles may be about 90 degrees or greater, about 110 degrees or greater, or even about 120 degrees or greater. The alternate exterior angles may be about 150 degrees or less, about 140 degrees or less, or even about 135 degrees or less.

The device may include one or more reinforcement structures. The reinforcement structures may function to reinforce the device when receiving and/or transferring a prying load, increasing the load bearing capability of the device, increasing strength of the device, or any combination thereof. The one or more reinforcement structures may allow the device to be sufficiently rigid to withstand the prying load. The reinforcement structures may allow the device to be sufficiently rigid to transmit at least a portion of the prying load to the engagement portion. The one or more reinforcement structures may be part of the intermediate portion. The one or more reinforcement structures may run along all or a portion of the length of the intermediate portion. The one or more reinforcement structures may be located at an upper surface, a lower surface, or both of the intermediate portion. The one or more reinforcement structures may extend at least partially into the engagement portion, the load applying portion, or both. The one or more reinforcement structures may include one or more rib structures, a stiffer material, localized thickness, the like, or any combination thereof.

The device may include one or more receptacles. The one or more receptacles may function to engage a handle, engage a load applying portion, engage one or more tips of a handle, or any combination thereof. The one or more receptacles may be located in the engagement portion, the load applying portion, a handle or any combination thereof. The one or more receptacles may have any size or shape suitable for engaging a handle, one or more tips of a handle, a load applying portion, or any combination thereof. The one or more receptacles may engage at least a portion of a handle (i.e., a connection portion, one or more tips) and/or a portion of the load applying portion (i.e., a threaded protrusion, a tab extension, etc) with a press fit, friction fit, lock fit, threaded fit, snap fit, cantilever snap fit, annular snap fit, a channel fit, the like, or any combination thereof. The one or more receptacles, connection portion, one or more tips, or any combination thereof may include an anti-rotation feature. For example, the anti-rotation feature may include one or more slots extending from the receptacle. The one or more receptacles may have a threaded bore. The threaded bore may engage with a threaded portion of a handle or the load applying portion. A threaded bore may provide for a threaded fastener fit with a portion of a handle. The one or more receptacles may have a geometry similar and/or reciprocal to a portion of a handle or a load applying portion. For example, the one or more receptacles may have a polygonal shape reciprocal to a polygonal shape of a portion of a handle or load applying portion. The similar and/or reciprocal geometry may provide for a friction fit or lock fit with a portion of a handle. The one or more receptacles may include a channel in the handle or the load applying portion. The channel may be a C-Channel, track channel, or similar. The channel may adapted to receive and engage a slide or track mating portion of the load applying portion or handle.

One or more receptacles may be sized differently than one or more other receptacles. A first receptacle may have a larger height and width than a second receptacle. A first receptacle may be located in the engagement portion. A second receptacle may be located in the load applying portion. The second receptacle may be larger than the first receptacle. A larger second receptacle may allow the load applying portion to be off-set from the engagement portion. By off-setting the engagement portion from the load applying portion, the engagement portion is configured to contact a portion of a dental covering and the load applying portion is configured to rest upon an adjacent surface. For example, the second receptacle may have a friction fit further down a length of a handle as opposed to the first receptacle. The second receptacle may allow the load applying portion to engage with a tip of a handle close to a joint of a handle (i.e., pivot joint of a hemostat, pliers, or forceps).

The device may be comprised of any material suitable for receiving the prying load, transferring the prying load, removing a dental device, preventing permanent deformation of the device, preventing damage to the dental covering and/or other teeth, being at least partially disposable, being reusable, or any combination thereof. The device may be comprised of a material which avoids substantial permanent deformation after use of the device to apply a prying load. The device may be comprised of plastic, rubber, metal, the like, or any combination thereof. The device may be biodegradable. The device may be comprised of biodegradable plastic. For example, the load applying portion, the intermediate portion, the engagement portion, the handle, or any combination thereof may comprise biodegradable plastic. One or more portions of the device may be comprised of different material than one or more other portions of the device. For example, a handle may comprise a different material as the load applying portion, the intermediate portion, and/or the engagement portion. For example, a handle may comprise metal or non-biodegradable plastic.

Kit for Dental Tool Assembly

The disclosure further relates to a kit comprising the device of the disclosure. The kit may include packaging. The kit may include a dental adhesive. Dental adhesive may include dental glue, dental cement, or the like. The kit may include a cleaning device. The cleaning device may remove dental adhesive. For example, the cleaning device may remove dental adhesive from an underlying tooth or post after removal of the dental covering. The kit may include one or more handling devices. The handling device may be adapted to engage with the dental tool. The kit may include a single handling device or a plurality of handling devices. The kit may include a single dental tool or a plurality of dental tools. For example, the kit may include a single handling device with a plurality of disposable dental tools. The single handling device may be for repetitive use, be easy to sanitize, or both. The disposable dental tools may be one-time use devices. The dental devices may also be adapted for repetitive use, easy to sanitize, or both.

Method of Using Dental Tool Assembly

The disclosure further relates to a method of using the handling device, dental tool, and/or dental tool assembly of the disclosure to remove a dental covering from a mouth of a patient. The method may include assembling a dental tool assembly; contacting the engagement portion to the portion of the dental covering; resting the load applying portion upon the adjacent surface relative to the dental covering;

applying the prying load by a hand of the operator and removing the dental covering from the mouth of the patient; or a combination thereof.

The method may include assembling the dental tool assembly. Assembling may include engaging a dental tool (e.g., device) with a handling device. The method may be free of assembling the dental tool to a handling device if they are formed integrally with one another, pre-assembled (e.g., assembled off-site before shipping to the operator). Assembling may include inserting of a dental tool into a receptacle of a handling device, inserting of a handling device into a receptacle of a dental tool, or both. All or a portion of the dental tool may be inserted into a receptacle of the handling device. The load applying portion, intermediate portion, engagement portion, or a combination thereof may be inserted into a receptacle of the handling device. The dental tool may be engaged with the handling device. Engaging may include abutting one or more lateral ends of a dental tool with one or more surfaces of the handling devices. Engaging may include abutting one or more lateral ends of an intermediate portion with one or more intermediate stop walls of a handling device. Engaging the handling device may include locating or inserting a portion (i.e., a connection portion, one or more tips) of a handling device into the load applying portion, the engagement portion, the intermediate portion, or a combination thereof. The handling device may be inserted into one or more receptacles. Engaging the handling device with the dental tool may include securing the components together via a threaded fit, snap fit, friction fit, channel fit, or any combination thereof. The method may include inserting or receiving a connection portion in the load applying portion. The method may include inserting a first tip of a handle into an engagement portion. The method may include inserting a second tip of a handle into a load applying portion. The method may include removing a dental tool from a handling device, a handling device from a dental tool, or both. The removal may be an opposite or reverse process as assembly. The method may include sterilizing any portion of the tool prior to contacting any portion of the assembly into a mouth of a patient.

The method may include contacting the engagement portion to a portion of the dental covering. A portion of the dental covering may be an extremity of the dental covering. Contacting the dental covering may include placing a lateral edge of the engagement portion adjacent to and in direct contact with a portion of the dental covering. Contacting the dental covering may include placing the upper surface of the engagement portion in direct contact with a base of a dental covering. Contacting the dental covering may include placing an off-set extension in direct contact with a portion of the dental covering. Contacting the dental covering may include wedging the engagement portion between a patient's gum line and the base of the dental covering.

The method may include resting the load applying portion upon an adjacent surface relative to the dental covering. Resting the load applying portion may include locating the lower surface of the load applying portion onto an adjacent surface.

The method may include applying a prying load by a hand of the operator. Applying the prying load may include applying the prying load separately, simultaneously, or both to an engagement portion, load applying portion, or both. Applying a prying load may include gripping a handling device. Applying a prying load may include applying a load to the handling device. The load may be applied to a portion of the handling device closer to a load applying portion than an engagement portion. The load may be applied to a portion of a handling device on an opposite side midpoint or midplane of the device as the dental tool within the handling device. The load may be applied to an end of a handle. Applying the prying load may include applying the prying load to a handling device, the dental tool, or both by the operator. The prying load may be applied to a handling device. The handling device may transfer the prying load to the dental tool to which it is engaged.

The prying load may be a combination of at least two loads. The prying load may include at least one linear force. The prying load may include at least one rotational force (i.e., torque). The at least two loads may be applied at one location or at least at two locations. The prying load may include an engagement load, a lifting load, or both. An engagement load may include a linear force. A lifting load may include a torque. The prying load may be applied to a single handle by a hand of a user. The handling device may transfer the prying load to a load applying portion, the intermediate portion, the engagement portion, or a combination thereof. Surfaces of a receptacle of the handling device in contact with surfaces of a dental tool may transfer the prying load from the handling device to the dental tool. The load applying portion may function as a fulcrum. The load applying portion may transfer the prying load to the intermediate portion, the engagement portion, or both. The prying load may be applied by at least two fingers of a hand of a user. A first finger may be in direct contact with the engagement portion. The first finger may be in direct contact with the lower surface of the engagement portion. The first finger may apply at least a rotational force. The rotational force may result in the dental covering moving away from the gum-line. A second finger may in in direct contact with the load applying portion, a handling device, or both. The second finger may be in direct contact with an upper surface of the load applying portion, exterior surface of a handling device, or both. The second finger may apply at least a linear force. The linear force may be in a direction toward the adjacent surface. The linear force may retain the load applying portion in direct contact with the adjacent surface. The linear force may allow the load applying portion, the junction between the load applying portion and an intermediate portion, or both to act as a fulcrum. By applying the rotational force and the linear force simultaneously, the engagement portion may rotate at least partially about the fulcrum. By rotating partially about the fulcrum, the engagement portion removes the dental covering.

The method may include removing the dental covering from the mouth of a patient. Removal of the dental covering may include lifting a dental covering from an underlying tooth, post, or other adhesive surface. Removal of the dental covering may include at least partially rotating the engagement portion about a fulcrum. Removal of the dental covering may include overcoming an adhesion force. The adhesion force may be provided by a temporary dental glue or cement.

Illustrative Embodiments

The following descriptions of the Figures are provided to illustrate the teachings herein, but are not intended to limit the scope thereof. Features of one embodiment may be employed in another embodiment.

FIG. 1 is a perspective view of a device 10 for removing a dental covering 300 (not shown). The device 10 is a unitary structure. The device 10 includes an engagement portion 12 and a load applying portion 14. The engagement portion 12 includes an upper surface 20 opposing a lower surface 22

(not shown). The upper surface 20 is shaped like a generally flat plate or is a flat plate portion. The engagement portion 12 has an overall generally rectangular shape. The engagement portion 12 includes four side surfaces. The side surfaces include a rear end 26, front end 24, and two lateral ends 28. The rear end 26 is adjacent to and connected with an intermediate portion 16. The front end 24 is distanced from and opposing the rear end 26. The rear end 26 and front end 24 are connected and adjacent to two lateral ends 28. The engagement portion 12 includes beveled edges 30 about at least some of the side surfaces. The engagement portion 12 includes rounded corners 32. The engagement portion 12 is connected to the load applying portion 14 by an intermediate portion 16. The intermediate portion 16 extends from the rear end 26 of the engagement portion 12.

FIG. 1 further illustrates the intermediate portion 16 includes an upper surface 34 opposing a lower surface 36 (not shown). The upper surface 34 is shaped like a generally flat plate or is a flat plate portion. The intermediate portion 16 has an overall generally rectangular shape. The intermediate portion 16 includes two opposing lateral ends 42. The lateral ends 42 are generally parallel in a plane to the lateral ends 28 of the engagement portion 12. The lateral ends 42 are adjacent and connected to the front end 38 and rear end 40 of the intermediate portion 16. The front end 38 of the intermediate portion 16 is integrated with the rear end 26 of the engagement portion. The rear end 40 of the intermediate portion 16 is integrated with a front end 50 of the load applying portion 14. The intermediate portion 16 distances the load applying portion 14 from the engagement portion 12 so that the load applying portion 14 and engagement portion 12 are generally parallel and distanced from one another.

FIG. 1 shows the load applying portion 14 includes an upper surface 44 opposing a lower surface 46 (not shown). The upper surface 44 is shaped like a generally flat plate or is a flat plate portion. The load applying portion 14 has an overall generally rectangular shape. The load applying portion 14 includes four side surfaces. The side surfaces include a rear end 48, front end 50, and two lateral ends 52. The front end 50 is adjacent to and connected with an intermediate portion 16. The front end 50 is distanced from and opposing the rear end 48. The rear end 48 and front end 50 are connected and adjacent to two lateral ends 52. The load applying portion 14 includes beveled edges 54 about the side surfaces. The load applying portion 14 includes rounded corners 56.

Figure 2:
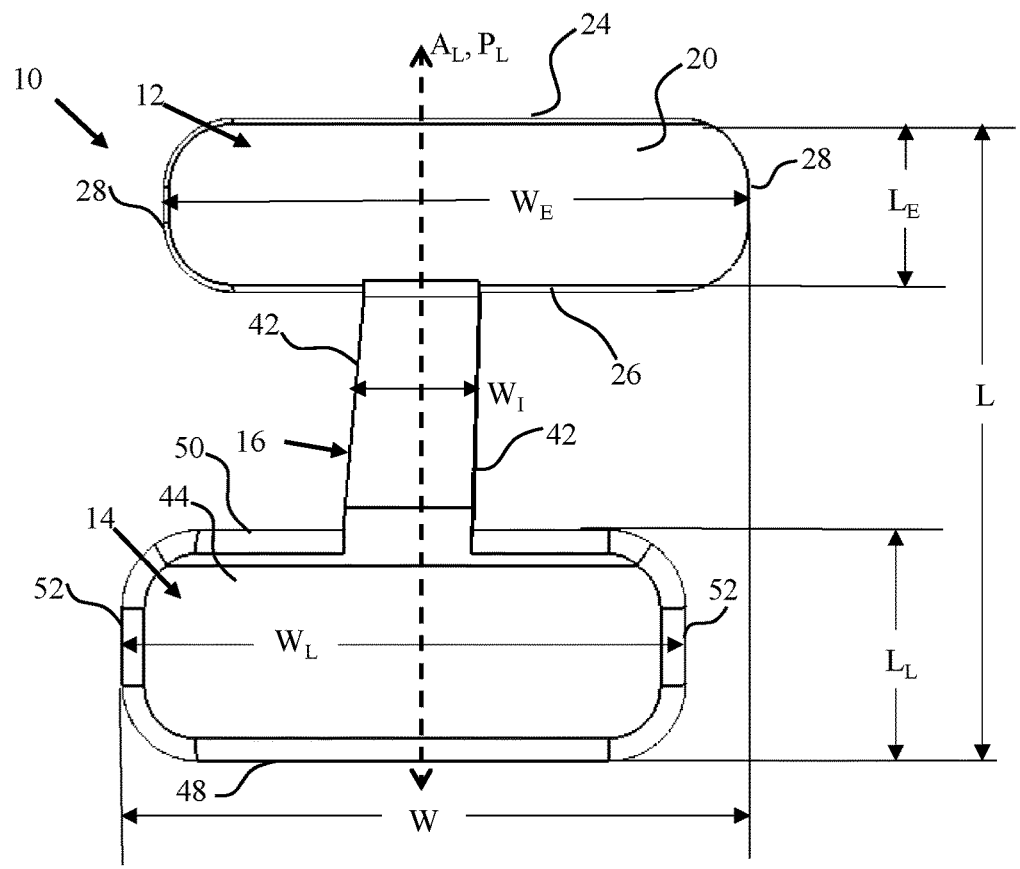
FIG. 2 is a top view of a dental tool according to the teachings herein.

FIG. 2 is a top view of a device 10 for removing a dental covering 300 (not shown). The device 10 includes a longitudinal axis AL which generally extends from the engagement portion 12 to the load applying portion 14. A longitudinal plane PL intersects through the longitudinal axis AL. The device 10 may be sufficiently symmetrical about the longitudinal axis AL and/or the longitudinal plane PL to allow for ambidextrous use of the device 10. The device has an overall length L which is the distance between the front end 24 of the engagement portion 12 to the rear end 48 of the load applying portion 14. The device has an overall width W which is the widest width of the device 10. In FIG. 2, the width W is the distance from the most outwardly lateral end 52 of the load applying portion 14 to the most outwardly lateral end 28 of the engagement portion 12.

FIG. 2 illustrates the engagement portion 12 includes a width WE which is the distance between the two lateral ends 28. The intermediate portion 16 includes a width WI which is the distance between the two lateral ends 42. The width WI of the intermediate portion 16 is smaller than the width WE of the engagement portion 12. The load applying portion 14 includes a width WL which is the distance between the two lateral ends 52 of the load applying portion 14. The width WI of the intermediate portion 16 is smaller than the width of WL of the load applying portion 14.

FIG. 2 further illustrates the engagement portion 12 and load applying portion 14 each have a length LE, LL. The length LE of the engagement portion 12 is the distance between the front end 24 and the rear end 26 of the engagement portion. The length LL of the load applying portion 14 is the distance between the front end 50 and rear end 48 of the load applying portion 14.

Figure 3:
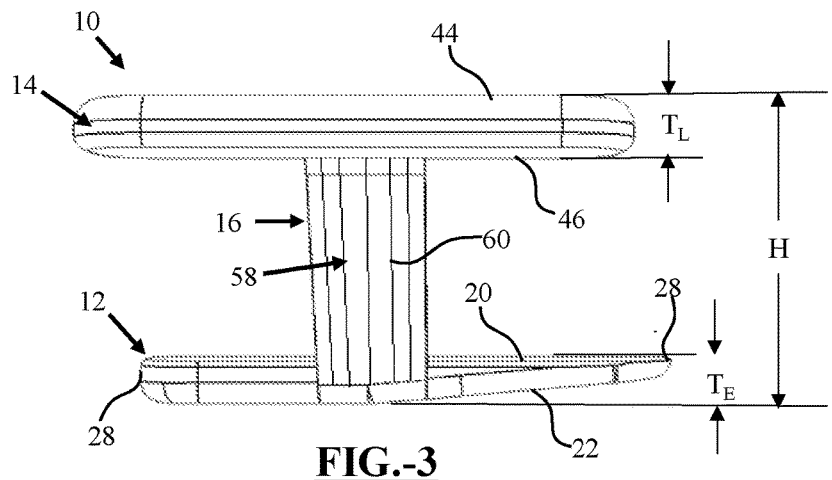
FIG. 3 is a rear view of a dental tool according to the teachings herein.

FIG. 3 illustrates a rear view of the device 10. The device 10 has an overall height H. The height H is the distance from an upper surface 44 of the load applying portion 14 to a lower surface 22 of the engagement portion 12. The load applying portion 14 is distanced from the engagement portion 12 by an intermediate portion 16. The load applying portion 14 has a thickness TL. The thickness TL is the distance between the upper surface 44 and the lower surface 46. The thickness TL of the load applying portion 14 is generally consistent across the entire width WL (not shown) of the load applying portion 14. The engagement portion 12 has a thickness TE. The thickness TE is the distance between the upper surface 20 and the lower surface 22. The thickness TE of the engagement portion 12 is generally consistent along a midsection of the width WE of the engagement portion 12. The thickness TE tapers towards one of the lateral ends 28 of the engagement portion 12. The thickness TE may taper towards both of the lateral ends 28 of the engagement portion.

FIG. 3 further illustrates one or more reinforcement structures 58. The intermediate portion 16 includes one or more reinforcement structures 58. The one or more reinforcement structures include one or more ribs 60. One or more ribs 60 extend at least partially into the engagement portion 12, the load applying portion 14, or both.

Figure 4:
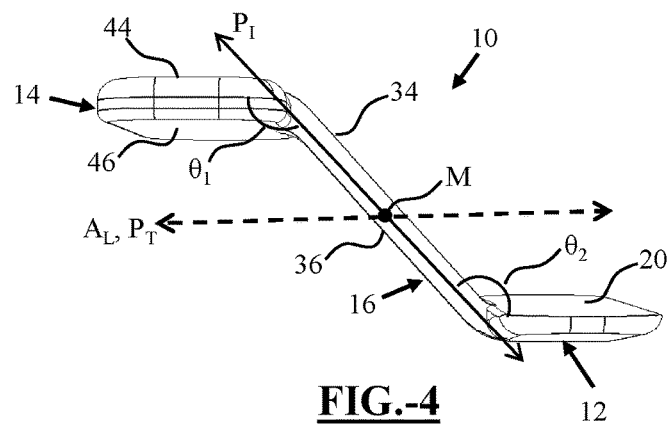
FIG. 4 is a side view of a dental tool according to the teachings herein.

FIG. 4 illustrates a side view of the device 10. The device includes a longitudinal axis AL which generally extends from the engagement portion 12 to the load applying portion 14. The intermediate portion 16 includes a midpoint M. The midpoint M is located between the engagement portion 12 and the load applying portion 14. The midpoint M intersects the longitudinal axis AL. A transverse plane PT runs generally parallel to the engagement portion 12, the load applying portion 14, or both. The transverse plane PT runs generally parallel to the longitudinal axis AL and is generally perpendicular to the longitudinal plane PL (not shown). The longitudinal axis AL may lie in the transverse plane PT. The transverse plane PT intersects the midpoint M. The engagement portion 12 is located on one side of the transverse plane PT. The load applying portion 14 is located on an opposing side of the transverse plane PT as the engagement portion 12.

FIG. 4 further illustrates the intermediate portion 16 lies in generally a single plane PI. The single plane PI is transverse to the engagement portion 12 (i.e., plate portion 20) and the load applying portion 14 (i.e. plate portion 44). The upper surface 20 of the engagement portion 12 and the upper surface 44 of the load applying portion 14 each project away from the single plane PI. The upper surfaces 20, 44 project away from the single plane PI in opposing directions. The upper surfaces 20, 44 project away from the single plane PI to form alternate exterior angles Θ1, Θ2. One alternate exterior angle Θ1 is formed by the lower surface 36 of the intermediate portion 16 and the lower surface 46 of the load applying portion 14. Another alternate exterior angle Θ2 is formed by the upper surface 34 of the intermediate portion 16 and the upper surface 20 of the engagement portion 12. The alternate exterior angles Θ1, Θ2 are obtuse.

Figure 5:
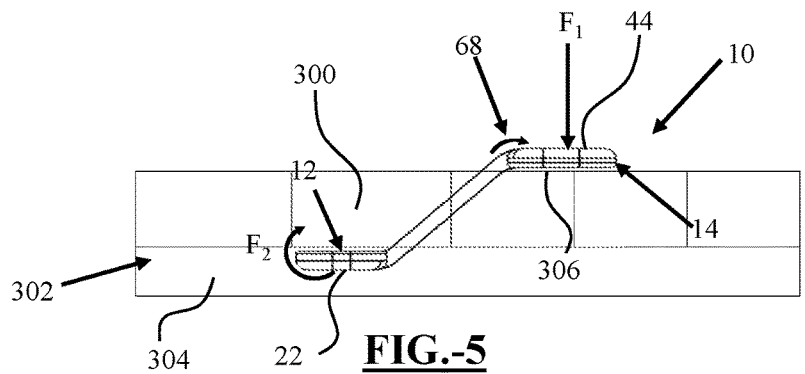
FIG. 5 is a side view of a dental tool removing a dental covering from a mouth of a patient according to the teachings herein.

FIG. 5 illustrates a side view of the device 10 removing a dental covering 300 from a patient's mouth 302. The load applying portion 14 rests on an adjacent surface 306 to the dental covering 300. The engagement portion 12 contacts a portion of the dental covering 300. The engagement portion 12 contacts a portion of the dental covering 300 adjacent the gum-line 304. To lift the dental covering 300, a linear force F1 is applied to the load applying portion 14. The linear force F1 is directed toward the upper surface 44 of the load applying portion 14 and toward the adjacent surface 306. To lift the dental covering 300, a rotational force F2 is applied to the engagement portion 12. The rotational force F2 is applied to the lower surface 22 of the engagement portion 12. The application of the linear force F1 and the rotational force F2 results in a fulcrum 68. The device 10 may pivot about the fulcrum 68 to pry the dental covering 300 from an underlying surface (not shown). The fulcrum 68 may be located between or on a portion of the load applying portion 14, the intermediate portion 16, or both.

Figure 6:
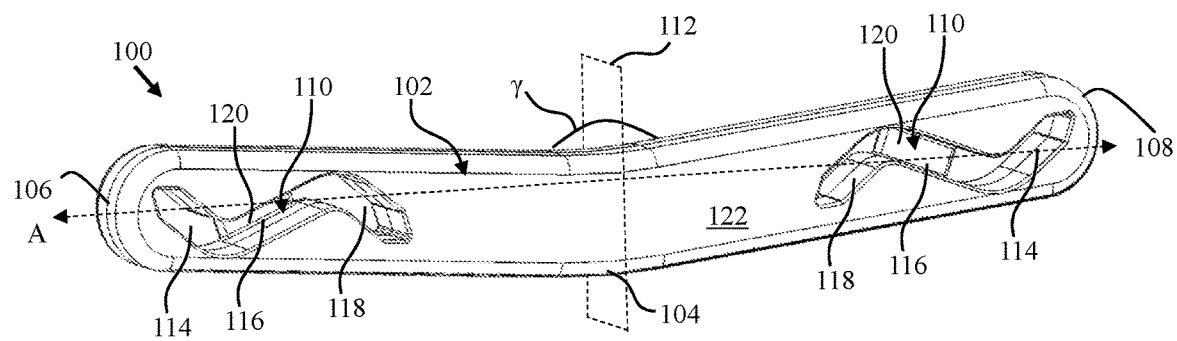
FIG. 6 is a perspective view of a handling device according to the teachings herein.
Figure 7:
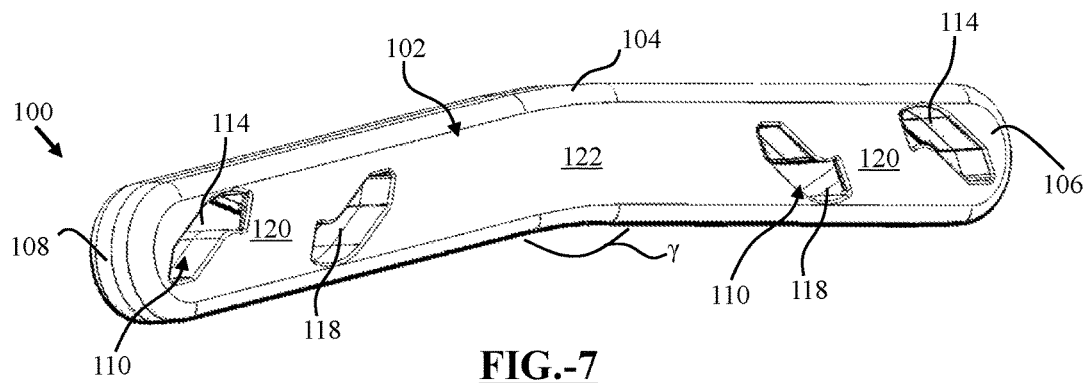
FIG. 7 is an opposing perspective view of the handling device of FIG. 6 according to the teachings herein.

FIGS. 6 and 7 illustrate a handling device 100. The handling device 100 includes a body 102. The body 102 is substantially rod-shaped. The body 102 includes an elbow 104 about midway through a length of the body 102. The elbow 104 imparts a bow-shape to the body 102. The elbow 104 forms an elbow angle γ. The elbow angle γ is such that opposing ends 106, 108 angle toward each other. Adjacent to each end 106, 108 is a receptacle 110. The receptacles 110 are substantially symmetrical with one another. The receptacles 110 are substantially mirrored about a plane 112 passing through the elbow 14. The plane 112 is located generally halfway between the opposing ends 106, 108. The plane 112 is generally perpendicular to a longitudinal axis A of the handling device 100. The receptacles 110 include an engagement portion cavity 114, an intermediate portion cavity 116, and a load applying portion cavity 118. The engagement portion cavity 114 and load applying portion cavity 118 pass completely through a thickness of the body 102. The intermediate portion cavity 116 includes an intermediate stop wall 120. The intermediate stop wall 120 is part of the body 102. The intermediate stop wall 120 is part of and continuous with an exterior surface 122 of the body 102.

Figure 8:
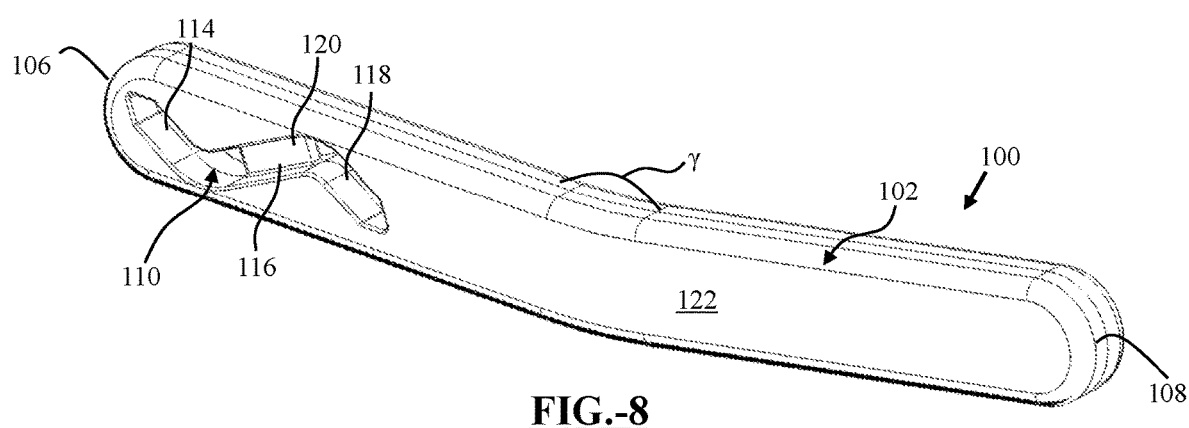
FIG. 8 is a perspective view of a handling device according to the teachings herein.

FIG. 8 illustrates a handling device 100. The handling device 100 includes a body 102. The body 102 is substantially rod-shaped. The body 102 includes an elbow 104 about midway through a length of the body 102. The elbow 104 imparts a bow-shape to the body 102. The elbow 104 forms an elbow angle γ. The elbow angle γ is such that opposing ends 106, 108 angle toward each other. Adjacent to one end 106 is a receptacle 110. The receptacle 110 includes an engagement portion cavity 114, an intermediate portion cavity 116, and a load applying portion cavity 118. The engagement portion cavity 114 and load applying portion cavity 118 pass completely through a thickness of the body 108. The intermediate portion cavity 116 includes an intermediate stop wall 120. The intermediate stop wall 120 is part of the body 102. The intermediate stop wall 120 is located about halfway through a depth of the receptacle 110. The intermediate stop wall 120 is located midway between opposing exterior surfaces 122 of the body 102.

Figure 9:
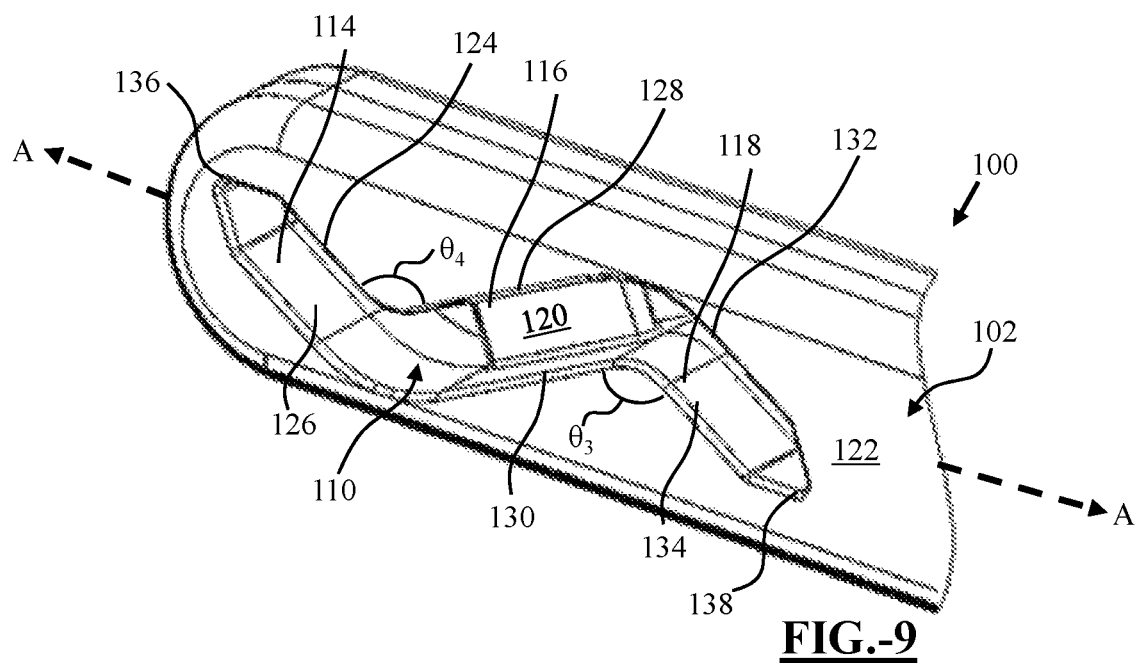
FIG. 9 is a close-up view of a handling device according to the teachings herein.

FIG. 9 illustrates a close-up view of a receptacle 110 of a handling device 100. The receptacle 110 is formed through a body 102 of the handling device 100. The receptacle 110 extends through opposing exterior surfaces 122 of the body 102. The receptacle 110 is made of three portions: an engagement portion cavity 114, an intermediate portion cavity 116, and a load applying portion cavity 118. Each of the cavities 114, 116, and 118 is continuous and in open into the adjacent cavity. The engagement portion cavity 114 is continuous with the intermediate portion cavity 116. The intermediate portion is continuous with the load applying portion cavity 118. The engagement portion cavity 114 includes an upper surface 124 and a lower surface 126. The intermediate portion cavity 116 includes an upper surface and a lower surface. The load applying portion includes an upper and lower surface. The upper and lower surfaces for each cavity are generally opposing each other. The upper surface of each cavity are continuous with the upper surfaces of the other cavities of the same receptacle. The lower surfaces of each cavity are continuous with the lower surfaces of the other cavities of the same receptacle. The engagement portion cavity 114 is substantially parallel with the load applying portion cavity 118. The intermediate portion cavity 116 is transverse to the engagement portion cavity 114 and the load apply portion cavity 118. Both the load applying portion cavity 118 and engagement portion cavity 114 project away from the intermediate portion cavity 116. The load applying portion cavity 118 and the engagement portion cavity 114 project at angles Θ3, Θ4 relative to the intermediation portion cavity 116. The angles Θ3, Θ4 are substantially alternate exterior angles Θ3, Θ4. The angles Θ3, Θ4 are substantially obtuse. The angles Θ3, Θ4 formed by the cavity portions of a receptacle 110 may be substantially equal to the angles Θ1, Θ2 (not shown) of a dental tool 10 (not shown) configured to be disposed within the receptacle 110. The receptacle 110 includes opposing ends 136, 138. An outward end 136 is formed where the upper surface 124 and lower surface 126 of the engagement portion cavity 114 come together. The inward and outward ends 134, 136 are tapered. An inward end 138 is formed where the upper surface 132 and the lower surface 134 of the load applying portion cavity 118 taper toward each other and come together. The outward end 136 is located closest to one or both of the ends 106, 108 of the body 102 where the upper surface The inward end 138 is located closest to a plane 112 (not shown) located about midway through the handling device 100. The intermediate portion cavity 116 includes an intermediate stop wall 120. The intermediate stop wall 120 is part of the body 102. The intermediate stop wall 120 is located about halfway through a depth of the receptacle 110. The intermediate stop wall 120 is located midway between opposing exterior surfaces 122 of the body 102. The intermediate stop wall 120 extends from an upper surface 128 to a lower surface 130 of the intermediate portion cavity 116.

Figure 10:
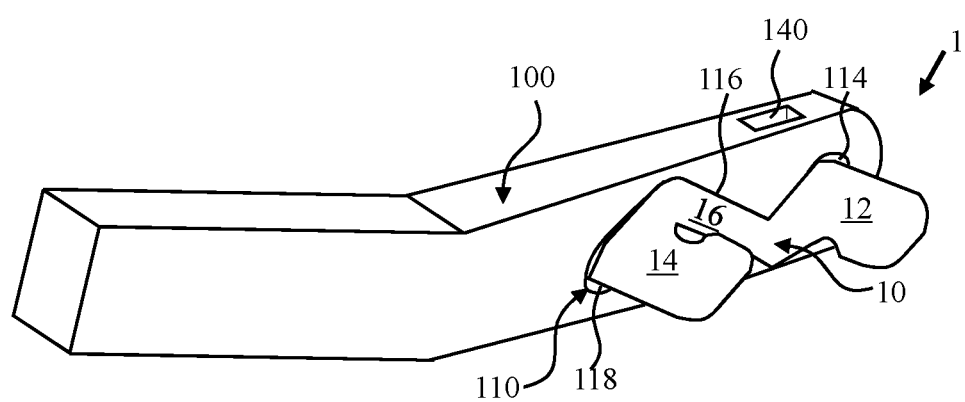
FIG. 10 is a perspective view of a handling device with a dental tool therein to form a dental tool assembly according to the teachings herein.
Figure 11:
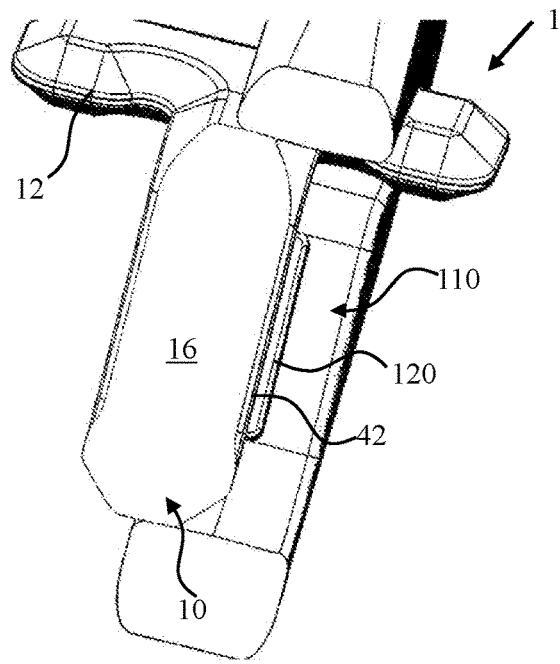
FIG. 11 is a cross-section view of a dental tool assembly according to the teachings herein.
Figure 12:
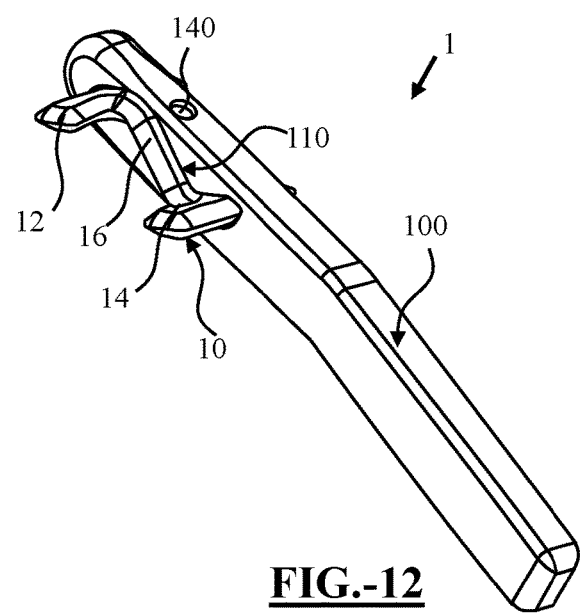
FIG. 12 is an opposing perspective view of the dental tool assembly of FIG. 10 according to the teachings herein.

FIGS. 10-12 illustrate a dental tool assembly 1. The assembly 1 includes a dental tool 10 located within a receptacle 110 of a handling device 100. The dental tool 10 is partially located within the receptacle 110. An engagement portion 12 resides within an engagement portion cavity 114. An intermediate portion 16 resides within an intermediate portion cavity 116. A load applying portion 14 resides within a load applying portion cavity 118. The intermediate portion 16 abuts with the intermediate stop wall 120 (not shown in FIGS. 10 and 12). The dental tool 10 is located on opposite sides of the intermediate stop wall 120 in FIGS. 10 and 12. When the dental tool 10 is engaged within the receptacle 110, of the lateral ends 42 is in contact with and abuts to the intermediate stop wall 120. The dental tool 10 is skewed within the receptacle 110 such that the dental tool 10 is off-center (e.g., longitudinal axes are offset). The handling device 100 includes a position indicator 140. The position indicator 140 is an opening which passes through the exterior surface 122 of the body 102 to the receptacle 110.

Figure 13:
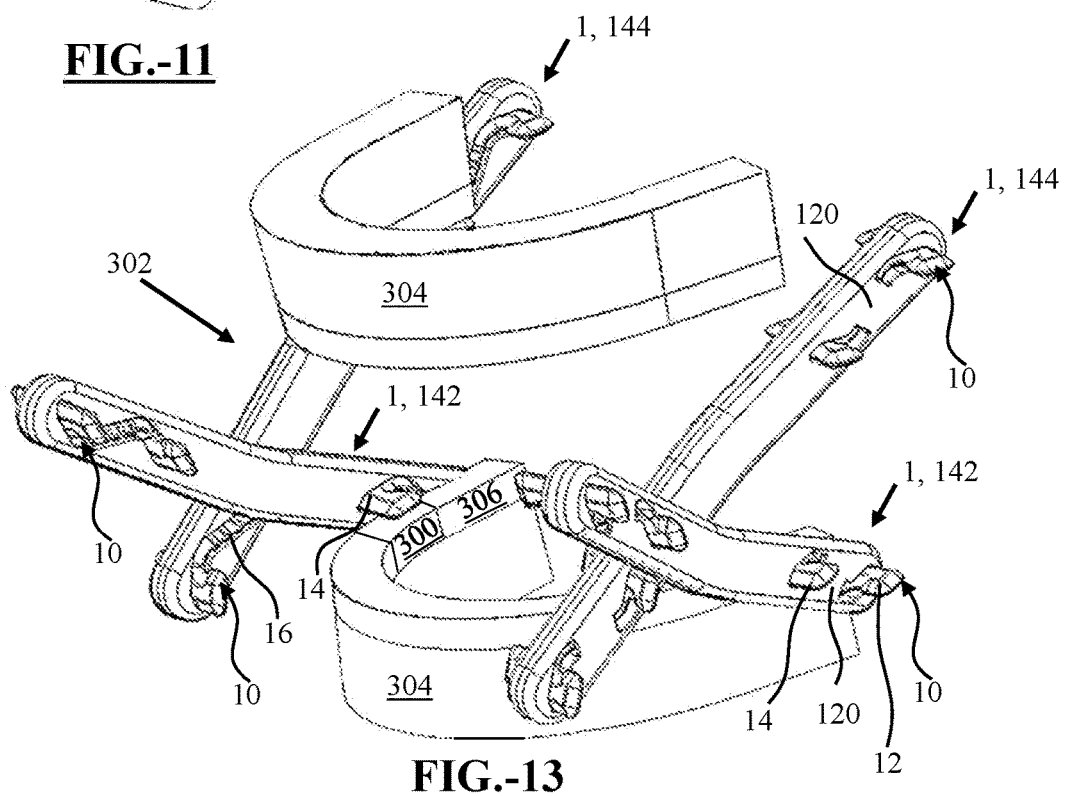
FIG. 13 illustrates varying positions of a dental tool assembly relative to a patient's mouth according to the teachings herein.
Figure 15:
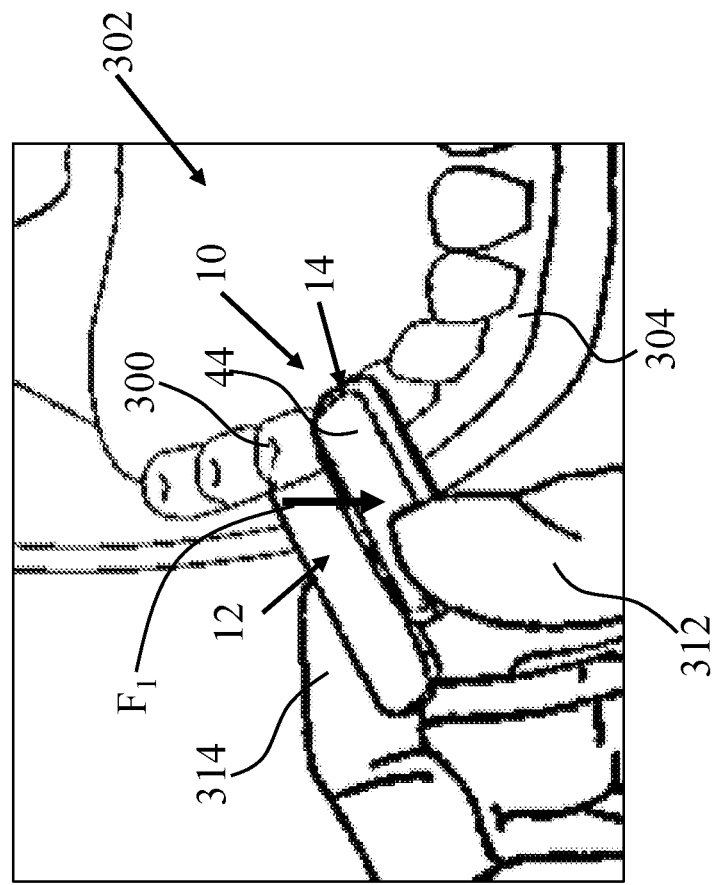
FIG. 15 is a close-up view of a dental tool in a mouth of a patient to remove a dental covering according to the teachings herein.
Figure 14:
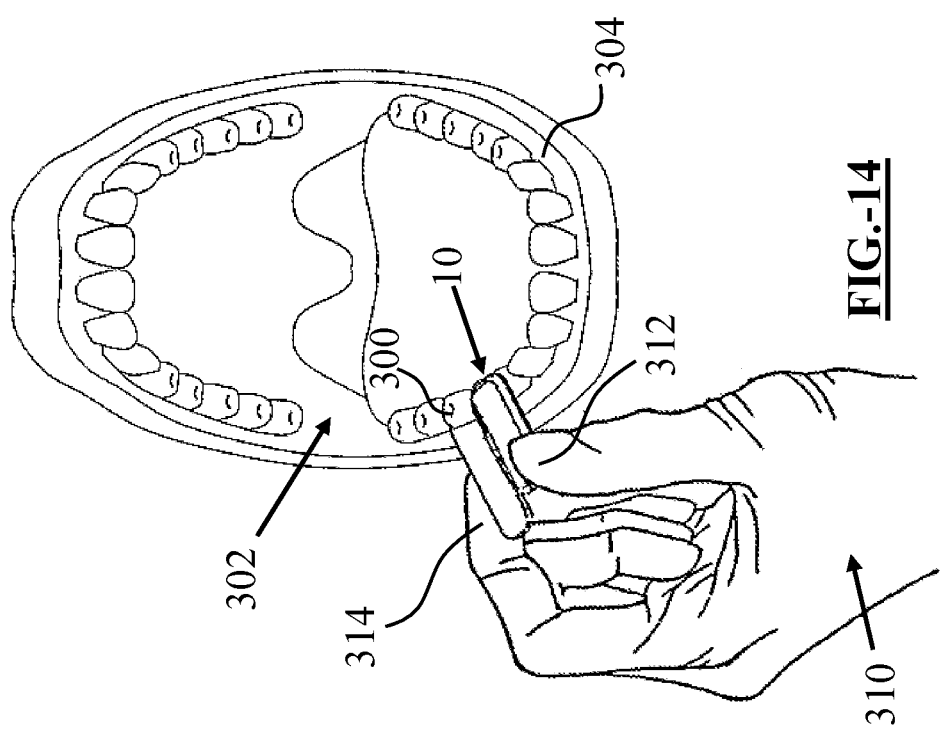
FIG. 14 is a perspective view of an operator using a dental tool to remove a dental covering from a mouth of a patient according to the teachings herein.

FIG. 13 illustrates varying positions of a dental tool assembly 1 relative to a mouth 302 of a patient. The dental tool assembly 1 includes a dental tool 10 within a handling device 100. The dental tool 10 includes a load applying portion 14, intermediate portion 16, and engagement portion 12. The load applying portion 14 is located within the load applying portion cavity 118. The intermediate portion 16 is located within the intermediate portion cavity 116. The engagement portion 12 is located with the engagement portion cavity 114. The intermediate portion 16 abuts with the intermediate stop wall 120. The varying positions of the dental tool assembly 1 include: lower jaw position 142 and upper jaw position 144. In the lower jaw position 142 and the upper jaw position 144, the load applying portion 14 rests on as surface 306 adjacent to a dental covering 300 and the engagement portion 12 is located between a dental covering 300 and a gum-line 304 of the mouth 302. In each position, the intermediate portion 16 is located between the gum-line 304 and the intermediate stop wall 120.

FIGS. 6 and 7 illustrate an operator using the device 10 to remove a dental covering 300. The operator holds the device 10 with his or her hand 310. The device 10 is located in a mouth 302 of a patient. The device 10 is located such that the load applying portion 14 rests on an adjacent surface 306. The device 10 is located such that the engagement portion 12 contacts a portion of the dental covering 300, such as between the gum-line 304 and the dental covering 300. The operator applies the linear force $F_1$ to the load applying portion 14 with a first finger 312. The operator applies the rotational force (torque) $F_2$ with a second finger 314. The linear force $F_1$ and the rotational force $F_2$ combined are the prying load. The prying load results in the dental covering 300 being pried and lifted away from the gum-line 304. Application of the prying load results in removal of the dental covering 300 with the device 10.

FIG. 16 illustrates a perspective view of the device 10 which includes a handling device 100 to form a dental tool assembly 1. The handling device 100 extends from the load applying portion 14. The load applying portion 14 includes a receptacle 64. The handling device 100 is inserted and engaged with the receptacle 64. A connection end (not shown) of the handing device 100 may have mating features to engage with the receptacle 64. The handling device 100 includes a handle grip 66. The handle grip 66 is substantially rod-shaped.

FIG. 17 illustrates a perspective view of a dental tool assembly 1. The handling device 100 includes receptacle 110. A dental tool 10 is partially located within the receptacle 110. The load apply portion 14 resides within the receptacle 110. The handling device 100 provides an extension from the dental tool 10 to provide a handle grip 66.

FIG. 18 illustrates a cut-out 70 in the device 10. The engagement portion 12 may include a cut-out 70 at the lateral end 28. It may be appreciated, the cut-out 70 may be located at a lateral end, front end, rear end, or any combination thereof of the engagement portion 12, the load applying portion 14, the intermediate portion 16, or any combination thereof. The cut-out 70 may help engage the engagement portion 12 with the dental covering 300 (not shown).

FIG. 19 illustrates an extension 72 in the device 10. The engagement portion 12 may include an extension 72 at the lateral end 28. It may be appreciated, the extension 72 may be located at a lateral end, front end, rear end, or any combination thereof of the engagement portion 12, the load applying portion 14, the intermediate portion 16, or any combination thereof. The extension 72 may help engage the engagement portion 12 with the dental covering 300 (not shown).

FIG. 20 illustrates a notch 74 in the device 10. The engagement portion 12 may include a notch 74 in the upper surface 20 near the lateral end 28. It may be appreciated, the notch 70 may be located at a lateral end, front end, rear end, upper surface, lower surface or any combination thereof of the engagement portion 12, the load applying portion 14, the intermediate portion 16, or any combination thereof. The notch 74 may help engage the engagement portion 12 with the dental covering 300 (not shown).

Figure 24:
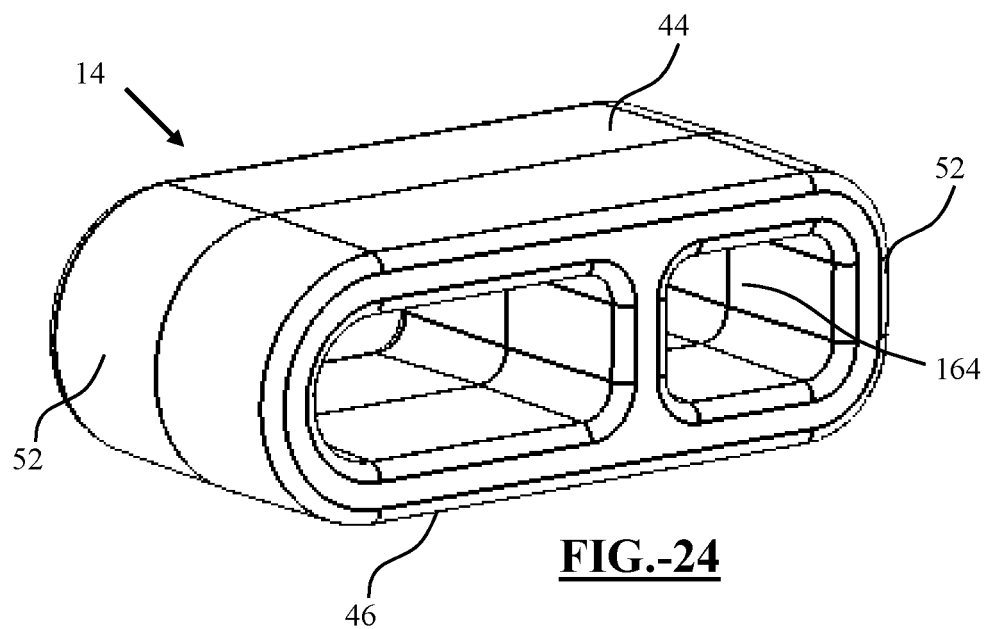
FIG. 24 illustrates a load applying portion having a receptacle according to the teachings.
Figure 25:
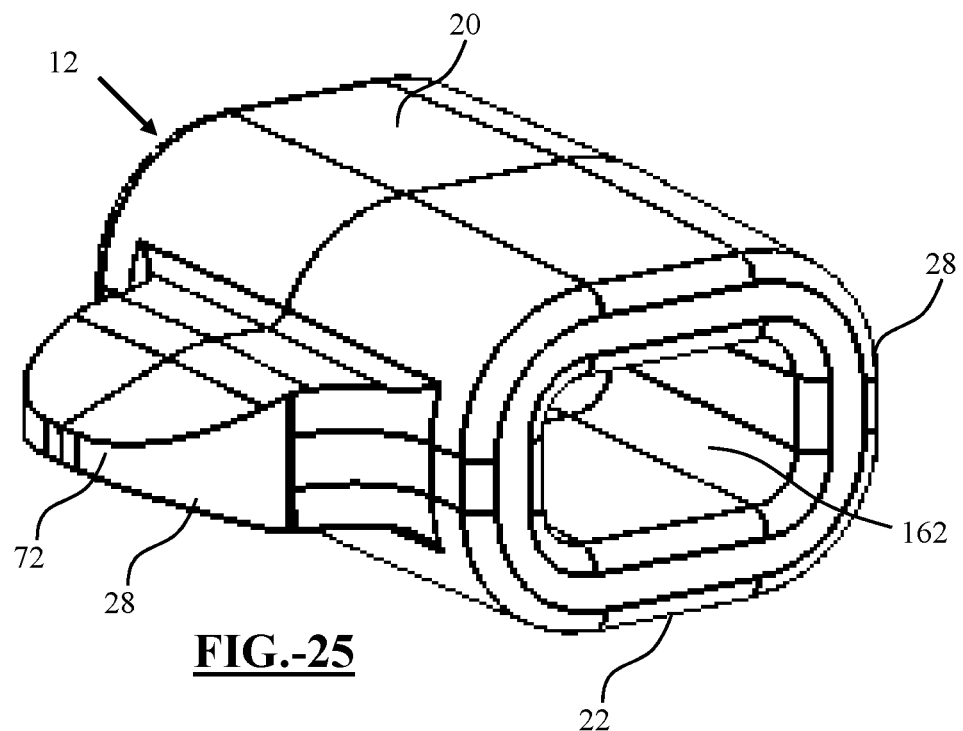
FIG. 25 illustrates an engagement portion having a receptacle according to the teachings herein.

FIGS. 21 and 22 illustrate a device 10 applied to a hemostat 160. The device 10 includes an engagement portion 12 and a load applying portion 14. The hemostat 160 may function as an intermediate portion 16 to connect the engagement portion 12 with the load applying portion 14. The hemostat 160 provides a handle grip 66 for a user to hold on to and control the device 10. The engagement portion 12 includes a first receptacle 162 (as shown in FIG. 25). The first receptacle 162 receives a tip 166 of the hemostat 160. The tip 166 cooperates with another tip 166 via a pivot joint 168 of the hemostat 160. The other tip 166 is received within a second receptacle 164 (as shown in FIG. 24). The second receptacle 164 is part of the load applying portion 14. The load applying portion 14 is off-set from the engagement portion 12 by being closer to the pivot joint 168 than the engagement portion 12.

FIGS. 23A and 23B illustrate the device 10 with a hemostat 160 removing a dental covering 300 from a patient's mouth 302. The load applying portion 14 rests on an adjacent surface 306 to the dental covering 300. The engagement portion 12 contacts a portion of the dental covering 300. The engagement portion 12 contacts a portion of the dental covering adjacent the gum-line 304. The pivot joint 168 allows a distance between the engagement portion 12 and the load applying portion 14 to be adjusted. By adjusting the distance between the engagement portion 12 and the load applying portion 14, different heights of dental coverings 300 may be accommodated by the device 10.

FIG. 24 shows a load applying portion 14 of the device 10. The load applying portion 14 includes an upper surface 44 and a lower surface 46. The load applying portion 14 includes lateral ends 52 between the upper surface 44 and the lower surface 46. The load applying portion includes a second receptacle 164. The second receptacle 164 is located between the upper surface 44 and lower surface 46. The second receptacle 164 is located between the lateral ends 52. The second receptacle 164 is adapted to receive a tip 166 (not shown) of the hemostat 160 (not shown).

FIG. 25 shows an engagement portion 12 of the device 10. The engagement portion 12 includes an upper surface 20 and a lower surface 22. The engagement portion 12 includes lateral ends 28 between the upper surface 20 and the lower surface 22. The engagement portion 12 includes a first receptacle 162. The first receptacle 162 is located between the upper surface 20 and the lower surface 22. The first receptacle 162 is located between the lateral ends 28. The first receptacle 162 is configured to receive a tip 166 (not shown) of the hemostat (160). The engagement portion 12 includes an off-set extension 72. The off-set extension 72 is located toward a lateral end 28. The off-set extension 72 is tapered towards a lateral end 28. The off-set extension 72 is substantially wedge-shaped to aid the engagement portion 12 engaging with a dental covering 300 (not shown).

Figure 26:
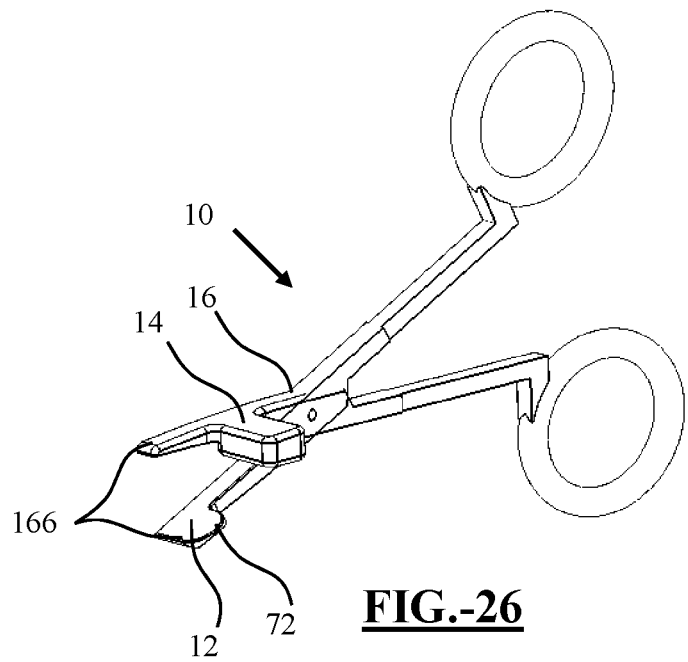
FIG. 26 is a perspective view of the dental tool assembly integrated with a hemostat according to the teachings herein.
Figure 27:
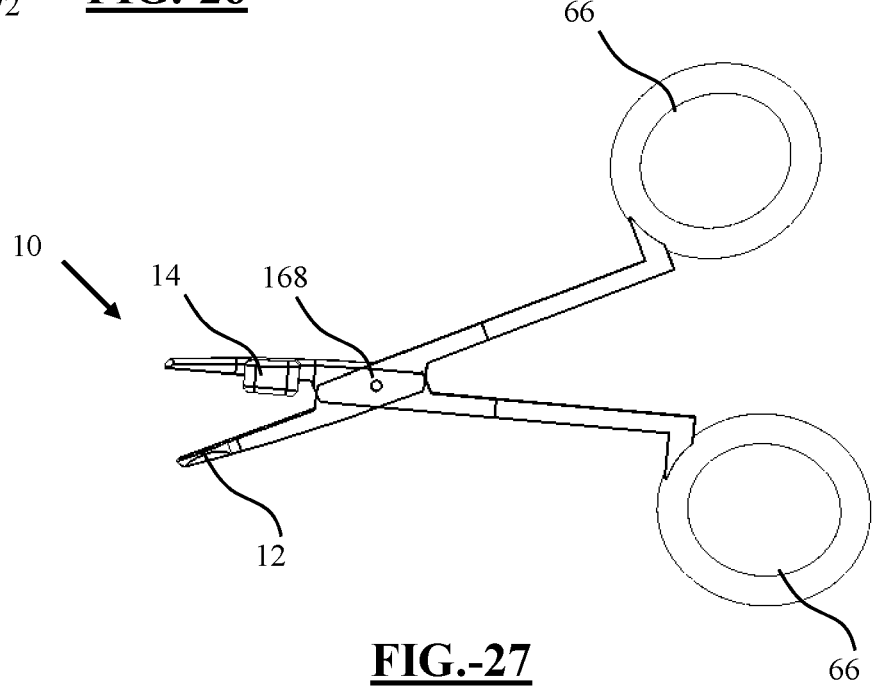
FIG. 27 is a side view of the dental tool integrated with a hemostat according to the teachings herein.

FIGS. 26 and 27 illustrate a device 10. The device 10 includes an engagement portion 12 connected to a load applying portion 14 via a pivot joint 168. The device 10 includes integrated handle grips 66 which rotate about the pivot joint 168. The handle grips 66 in combination with the pivot joint 168 may function as an intermediate portion 16 which connects the load applying portion 14 to the engagement portion 12. The device 10 includes a two tips 166. One of the tips 166 is integrated with the engagement portion 12. The engagement portion 12 includes an off-set extension 72. The off-set extension includes a tapered thickness. The off-set extension is configured to contact a portion of the dental covering 300 (not shown). One of the tips 166 is integrated with the load applying portion 14. The load applying portion 14 opposes the engagement portion 12.

Figure 28:
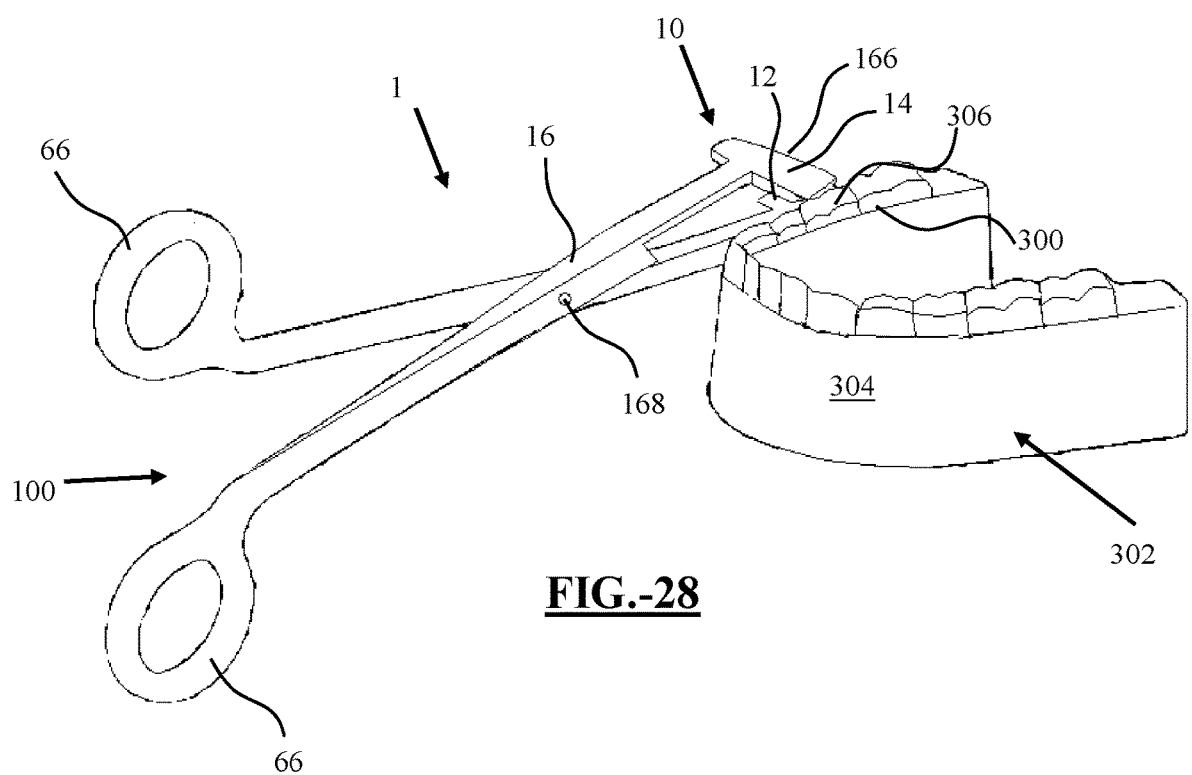
FIG. 28 is a perspective view of the dental tool assembly integrated into a hemostat and located within a mouth of a patient according to the teachings herein.

FIG. 28 illustrates a dental tool assembly 1. The dental tool assembly 1 has a handling device 100 integrated with a dental tool 10. The handling device 100 includes a pivot joint 180. The pivot joint 180 is also an intermediate portion 16 which connects an engagement portion 12 to a load applying portion 14. The load applying portion 14 and engagement portion 12 are part of the dental tool 10. The load applying portion 14 and engagement portion 12 are located at the tips 166 of the assembly 1. The lateral ends 22, 28 of both the load applying portion 14 and engagement portion 12 are shown extending both ways from the longitudinal axis of the assembly 1. The load apply portion 14 and engagement portion 12 are both substantially symmetrical (e.g, mirrored) about the axis of the assembly 1.

REFERENCE NUMBER LISTING

1 Dental tool assembly
10 Device
12 Engagement portion
14 Load Applying portion
16 Intermediate portion
20 Upper surface of engagement portion
22 Lower surface of engagement portion
24 Front end of engagement portion
26 Rear end of engagement portion
28 Lateral ends of engagement portion
30 Beveled edges of engagement portion
32 Rounded corners of engagement portion
34 Upper surface of intermediate portion
36 Lower surface of intermediate portion
38 Front end of intermediate portion
40 Rear end of intermediate portion
42 Lateral ends of intermediate portion
44 Upper surface of load applying portion
46 Lower surface of load applying portion
48 Rear end of load applying portion
50 Front end of load applying portion
52 Lateral ends of load applying portion
54 Beveled edges of load applying portion
56 Rounded corners of load applying portion
58 Reinforcement structures
60 Ribs
62 Handle
64 Receptacle
66 Handle Grip
68 Fulcrum Point
70 Cut-out
72 Extension
74 Notch
100 Handling device
102 Body
104 Elbow
106 End of body
108 Opposing end of body
110 Receptacle
112 Plane
114 Engagement portion cavity
116 Intermediate portion cavity
118 Load applying portion cavity
120 Intermediate stop wall
122 Exterior surface(s) of body
124 Upper surface of engagement portion cavity
126 Lower surface of engagement portion cavity
128 Upper surface of intermediate portion cavity
130 Lower surface of intermediate portion cavity
132 Upper surface of load applying portion cavity
134 Lower surface of load applying portion cavity
136 Outward end of receptacle
138 Inward end of receptacle
140 Position indicator
160 Hemostat
162 First receptacle of engagement portion
164 Second receptacle of load applying portion
166 Tips of hemostat
168 Pivot joint
180 Pivot joint
300 Dental covering
302 Mouth of a patient
304 Gum-line
306 Adjacent surface
310 Hand
312 First finger
314 Second finger
A Longitudinal axis of handling device
$A_L$ Longitudinal Axis of dental tool
$F_1$ Prying Load (linear) at load applying portion
$F_2$ Prying load (rotational force) at engagement portion
H Overall height of device
L Length of Device
$L_E$ Length of Engagement Portion
$L_I$ Length of Intermediate Portion
$L_L$ Length of Load Prying Portion
M Midpoint
$P_I$ Single plane of intermediate portion
$P_L$ Longitudinal plane
$P_T$ Transverse Plane
$T_E$ Thickness of Engagement Portion
$T_I$ Thickness of Intermediate Portion
$T_L$ Thickness of Load Prying Portion
W Width of Device
$W_E$ Width of Engagement Portion
$W_I$ Width of Intermediate Portion
$W_L$ Width of Load Prying Portion
$\Theta_1$ Alternate exterior angle of dental tool
$\Theta_2$ Alternate exterior angle of dental tool
$\Theta_3$ Angle of receptacle in handling device
$\Theta_4$ Angle of receptacle in handling device
$\gamma$ Angle of elbow in handling device Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A dental tool assembly comprising:
    a) a handling device having:
        i) a body configured to receive a prying load from an operator;
        ii) one or more receptacles through the body which pass from one exterior surface to an opposing exterior surface;
    b) one or more dental tools, each having:
        i) a load applying portion which is adapted to rest upon an adjacent surface relative to a dental covering;
        ii) an engagement portion which tapers to a smaller thickness toward one or more lateral ends and adapted to contact a portion of the dental covering by being wedged between a gum-line and the dental covering,
        iii) an intermediate portion which is integral with and adjacent to both the engagement portion and the load applying portion to bridge the load applying portion and the engagement portion, wherein a width of the intermediate portion is smaller than a width of both the load applying portion and the engagement portion, and wherein the intermediate portion is transverse to both the engagement portion and the intermediate portion; and
    wherein the one or more dental tools are located within the one or more receptacles, and the one or more receptacles are configured to transfer the prying load from the body to the engagement portion of the dental tool.

2. The dental tool assembly of claim 1, wherein the one or more receptacles have a shape reciprocal with a profile of the one or more dental tools.

3. The dental tool assembly of claim 2, wherein the one or more dental tools have a friction fit, snap fit, interference fit, or combination thereof with the one or more receptacles.

4. The dental tool assembly of claim 1, wherein the one or more receptacles include a load applying portion cavity reciprocal with the load applying portion of the one or more dental tools and in which the load applying portion is located.

5. The dental tool assembly of claim 1, wherein the one or more receptacles include an intermediate portion cavity reciprocal with the intermediate portion of the one or more dental tools and in which the intermediate portion is located.

6. The dental tool assembly of claim 1, wherein the one or more receptacles include an engagement portion cavity reciprocal with the engagement portion of the one or more dental tools and in which the engagement portion is located.

7. The dental tool assembly of claim 6, wherein the one or more lateral ends of the engagement portion reside outside of the engagement portion cavity.

8. The dental tool assembly of claim 1, wherein the one or more receptacles include a stop wall adapted to limit movement of the one or more dental tools within the one or more receptacles by abutting to one or more lateral ends of the one or more dental tools.

9. The dental tool assembly of claim 8, wherein the stop wall is substantially continuous with an exterior surface of the body, is located within the one or more receptacles, or both.

10. The dental tool assembly of claim 1, wherein the body is substantially rod shaped, cylindrically-shaped, cuboid-shaped, or a combination thereof.

* * * * *